(12) United States Patent
Kusama et al.

(10) Patent No.: US 10,310,367 B2
(45) Date of Patent: Jun. 4, 2019

(54) PROJECTION SCREEN

(71) Applicant: LINTEC Corporation, Tokyo (JP)

(72) Inventors: Kentaro Kusama, Tokyo (JP); Baku Katagiri, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/894,316

(22) Filed: Feb. 12, 2018

(65) Prior Publication Data

US 2018/0284591 A1    Oct. 4, 2018

(30) Foreign Application Priority Data

Mar. 31, 2017 (JP) .................................. 2017-071366

(51) Int. Cl.
*G02B 5/02* (2006.01)
*G03B 21/62* (2014.01)

(52) U.S. Cl.
CPC ............ *G03B 21/62* (2013.01); *G02B 5/0236* (2013.01); *G02B 5/0278* (2013.01); *G02B 5/0257* (2013.01)

(58) Field of Classification Search
CPC .......................... G02B 27/095; G02B 5/0236
USPC ........................................................ 359/460
See application file for complete search history.

(56) References Cited

U.S. PATENT DOCUMENTS

| | | | |
|---|---|---|---|
| 2005/0219692 A1 | 10/2005 | Okada et al. | |
| 2005/0225687 A1* | 10/2005 | Yamauchi | G03B 21/60 |
| | | | 349/5 |
| 2014/0340752 A1 | 11/2014 | Kusama et al. | |
| 2014/0340753 A1 | 11/2014 | Kusama et al. | |
| 2015/0355390 A1 | 12/2015 | Katagiri et al. | |
| 2016/0018571 A1 | 1/2016 | Kusama et al. | |
| 2016/0025907 A1 | 1/2016 | Kusama et al. | |
| 2016/0033692 A1 | 2/2016 | Kusama et al. | |
| 2016/0047952 A1 | 2/2016 | Kusama et al. | |
| 2016/0070035 A1 | 3/2016 | Kusama et al. | |
| 2016/0077246 A1 | 3/2016 | Kusama et al. | |
| 2017/0192137 A1* | 7/2017 | Sakano | B29D 11/00798 |

(Continued)

FOREIGN PATENT DOCUMENTS

| | | | | |
|---|---|---|---|---|
| JP | 2005316354 A | | 11/2005 | |
| JP | 2012141593 A | * | 7/2012 | ........... G02B 5/0257 |
| JP | 2013117702 A | | 6/2013 | |

(Continued)

*Primary Examiner* — Christopher E Mahoney
(74) *Attorney, Agent, or Firm* — Renner Kenner; Arthur M. Reginelli

(57) ABSTRACT

Provided is a projection screen which can effectively diffuse incident light coming from a wide angle, despite that the number of laminated sheets of a light diffusion control film is small such as 3 to 4 sheets, and can thereby provide a wide viewing angle even if the projection screen is applied to a large-sized screen. Disclosed is a projection screen having a light diffusion control plate, the light diffusion control plate being formed by laminating a plurality of sheets of a light diffusion control film, the light diffusion control film being a light diffusion control film having a single light diffusion layer having a first internal structure and a second internal structure sequentially from the lower part along the film thickness direction, in which the first internal structure is a predetermined louver structure, and the second internal structure is a predetermined columnar structure.

9 Claims, 25 Drawing Sheets

(56) References Cited

U.S. PATENT DOCUMENTS

2017/0293054 A1  10/2017  Kusama et al.

FOREIGN PATENT DOCUMENTS

| | | |
|---|---|---|
| JP | 2013117703 A | 6/2013 |
| JP | 2013148712 A | 8/2013 |
| JP | 2013210408 A | 10/2013 |
| JP | 2013210409 A | 10/2013 |
| JP | 2014002186 A | 1/2014 |
| JP | 2014002187 A | 1/2014 |
| JP | 2014002188 A | 1/2014 |
| JP | 2014126749 A | 7/2014 |
| JP | 2014126750 A | 7/2014 |
| JP | 2014126771 A | 7/2014 |
| JP | 2014191340 A | 10/2014 |
| JP | 2016048290 A | 4/2016 |

\* cited by examiner

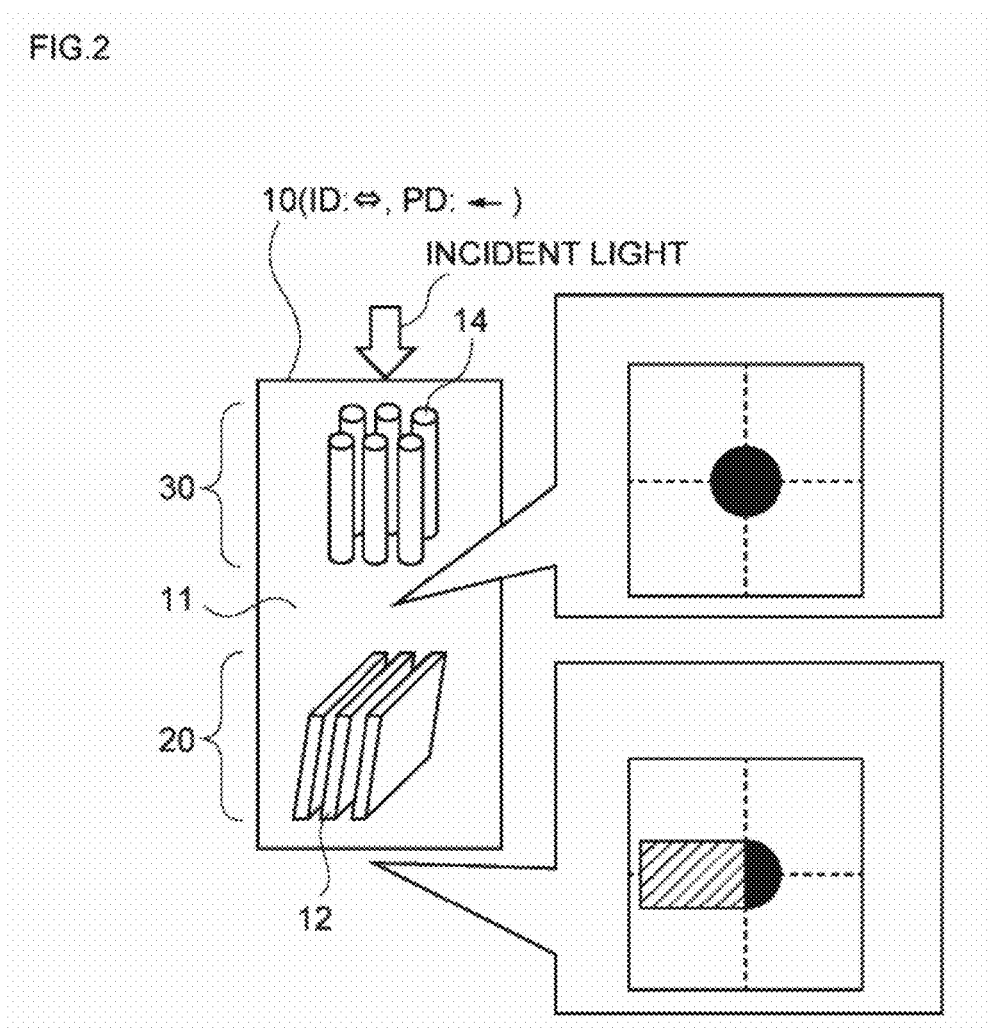

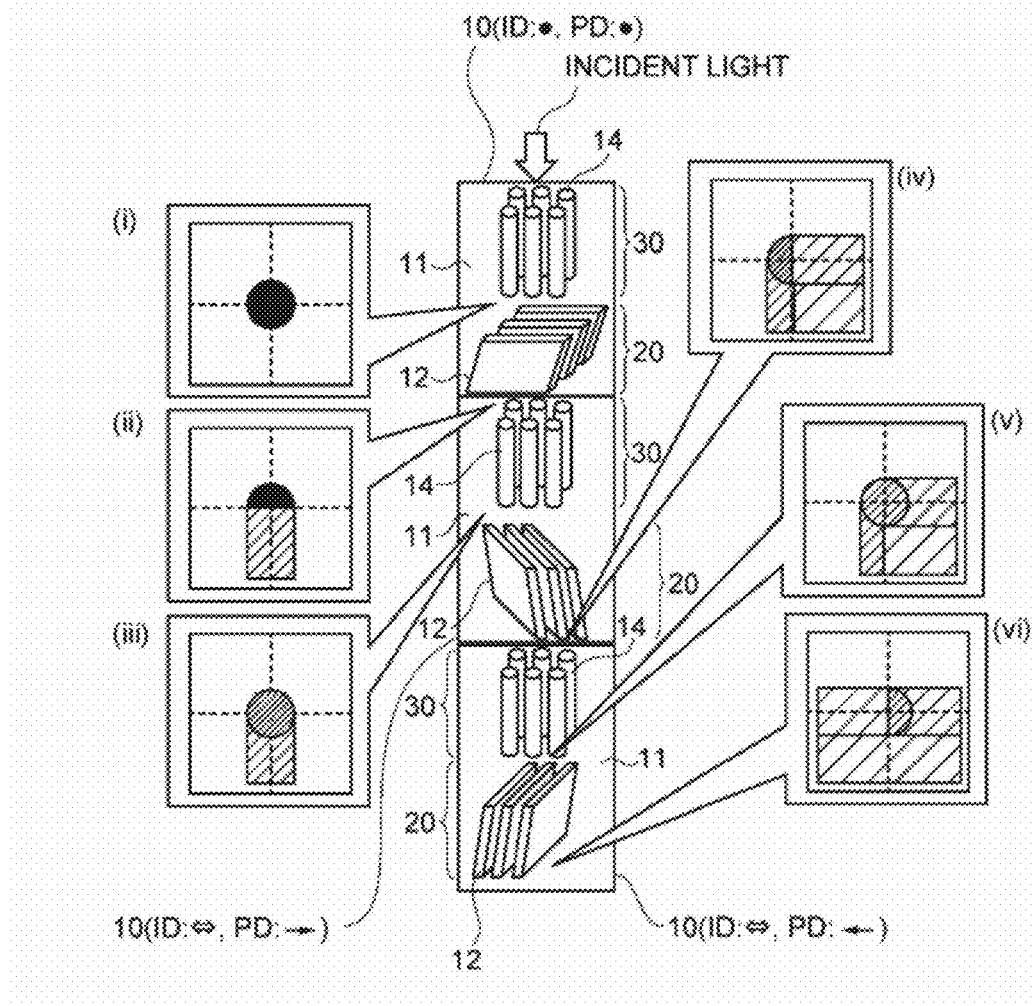

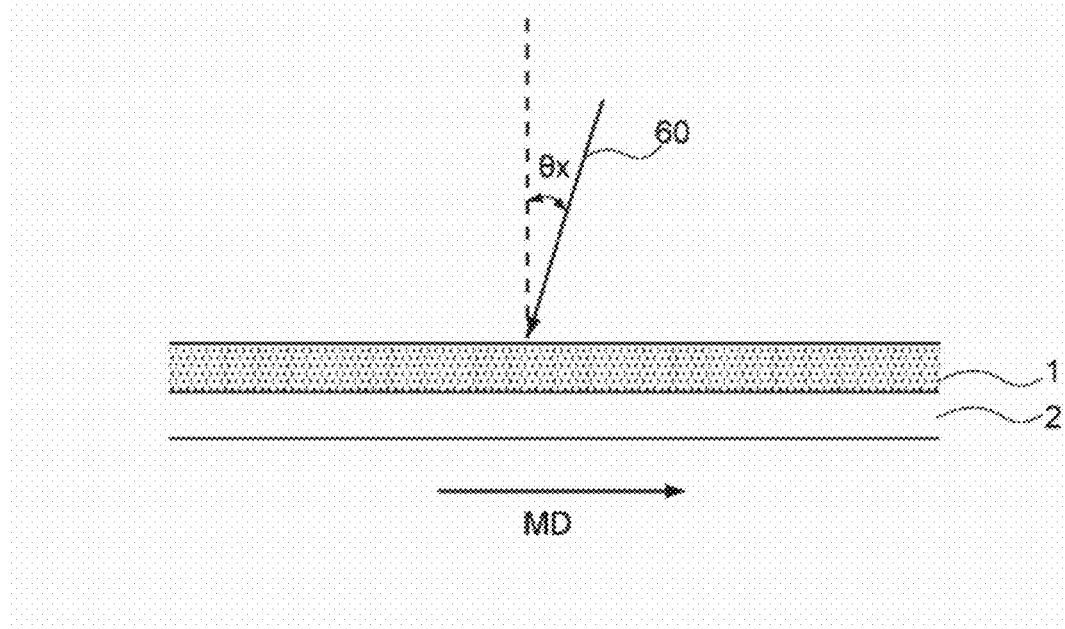

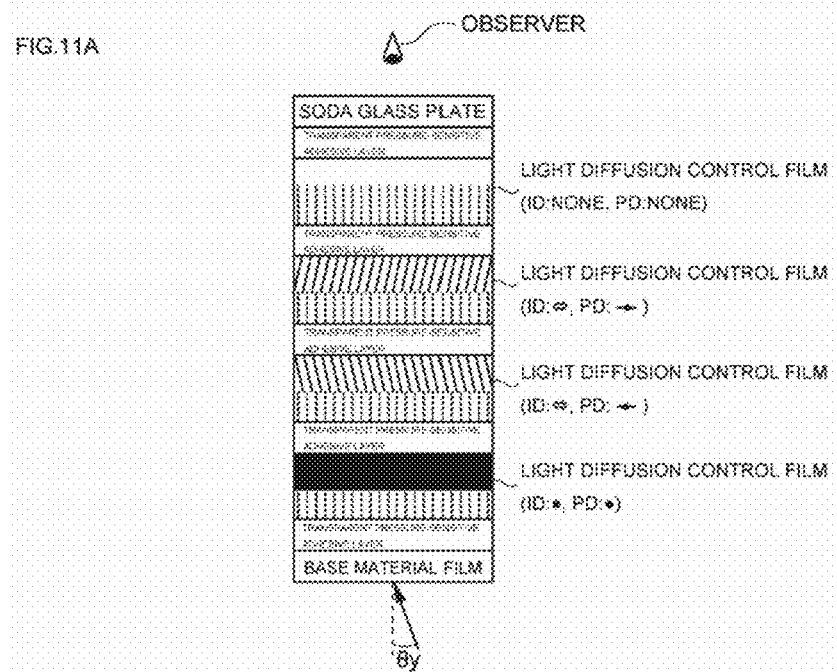
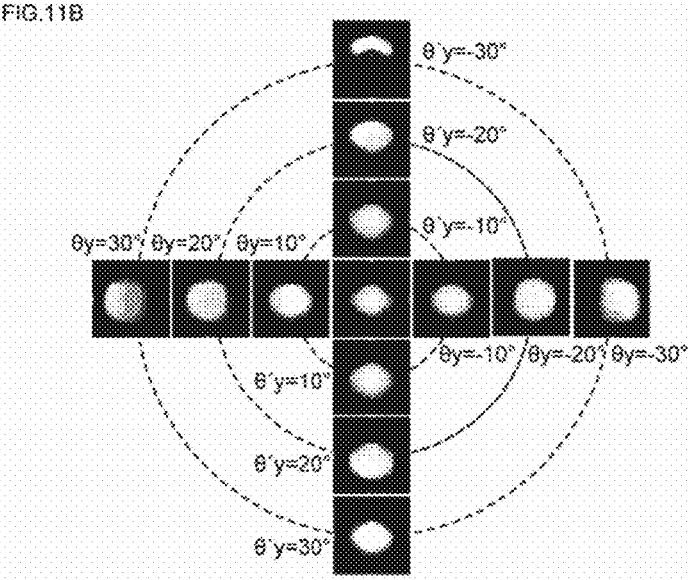

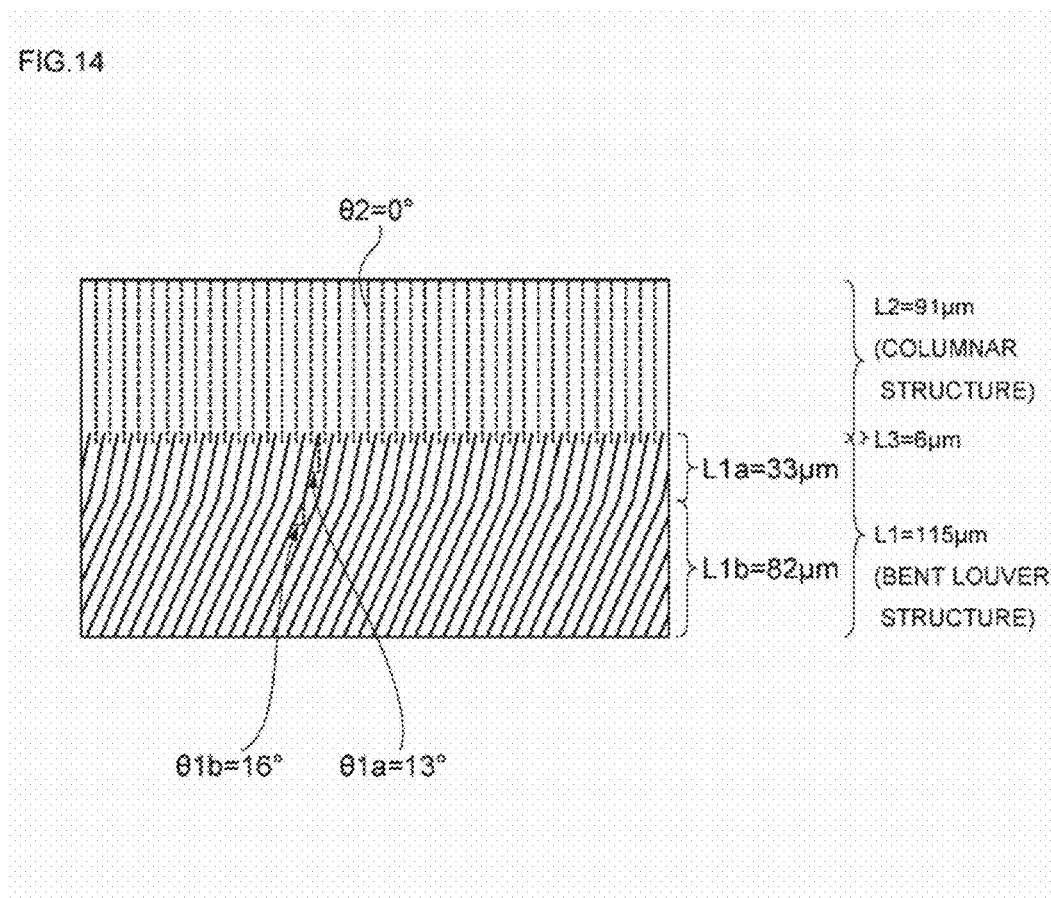

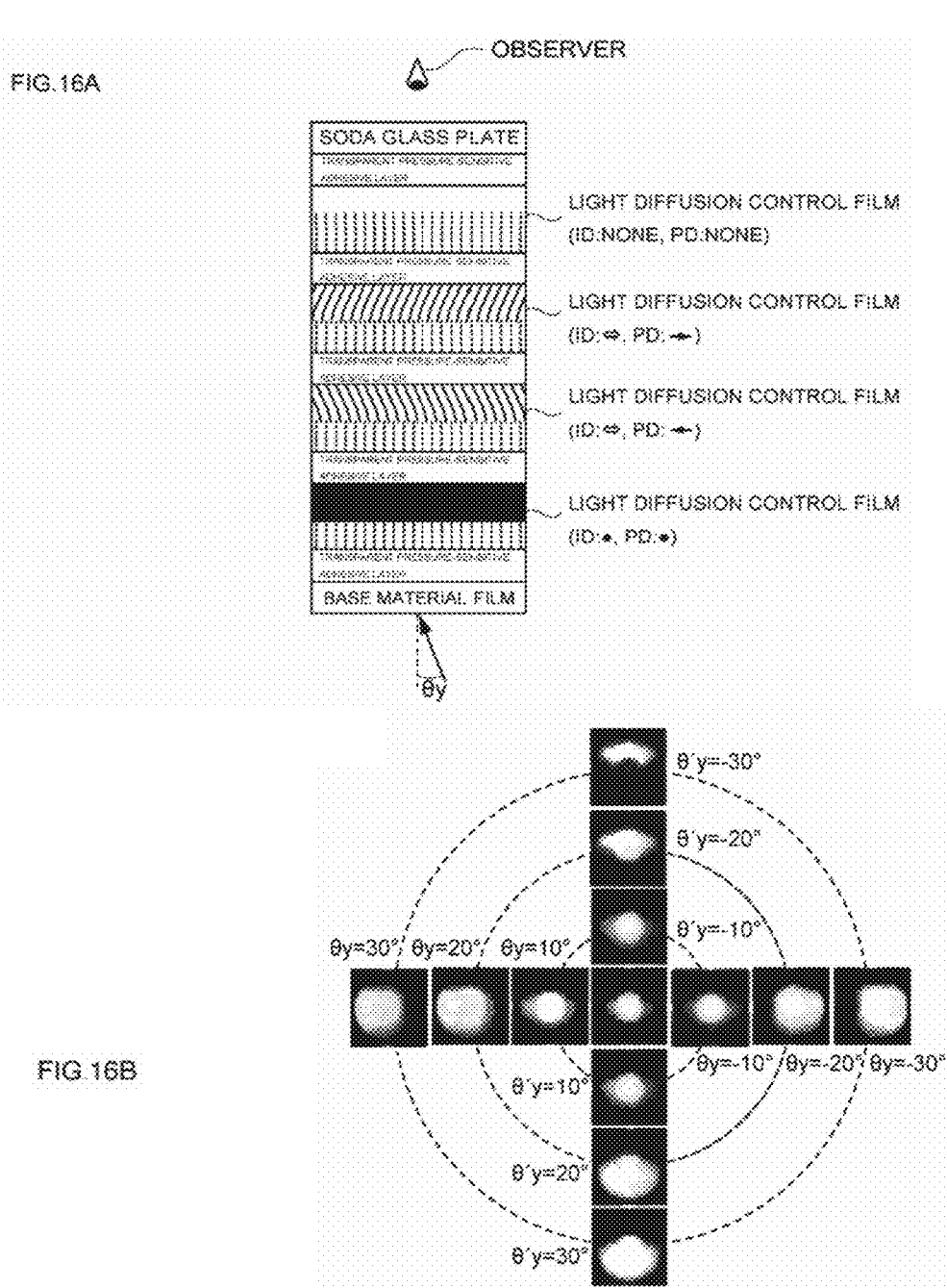

FIG. 25
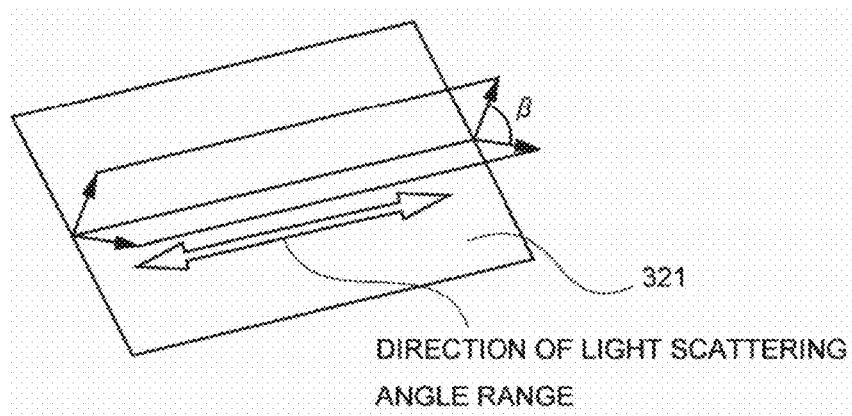
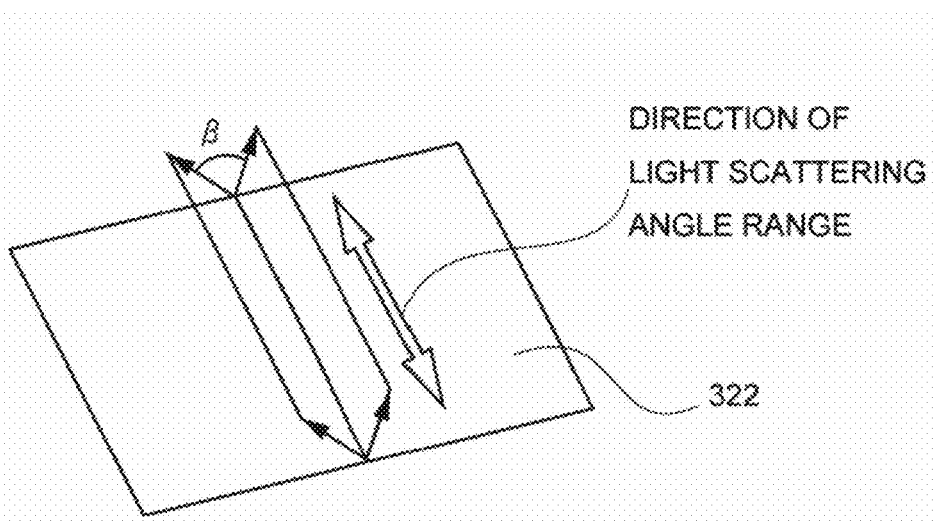

PROJECTION SCREEN

BACKGROUND OF THE INVENTION

1. Field of the Invention

The present invention relates to a projection screen.

More particularly, the invention relates to a projection screen, with which incident light coming from a wide angle can be effectively diffused despite that the number of laminated sheets of a light diffusion control film is small, such as 3 to 4 sheets, and a wide viewing angle can be obtained even in a case in which the projection screen is applied as a large-sized screen.

2. Description of the Related Art

A rear projection display is also referred to as rear surface projection type display apparatus and is a display mode in which an image projected from the back surface side of a screen with a projector is viewed from the front surface side of the screen.

Regarding a transmission type projection screen used in such a rear projection display (hereinafter, may be referred to as "rear projection screen"), a projection screen produced by combining a Fresnel lens and a lenticular lens is known.

However, in regard to such conventional rear projection screens, generally, there has been a problem that the screen image is not bright enough, and a moiré pattern attributed to the pitch is likely to be generated in the screen image.

In this regard, a rear projection screen which utilizes a light diffusion control film has been suggested as a rear projection screen of a new type that does not use a conventional Fresnel lens or a conventional lenticular lens (see, for example, JP 2005-316354 A (Claims)).

Here, a light diffusion control film refers to a film in which the diffusion state of exiting light changes depending on the angle of incidence of the incident light.

Specifically, a light diffusion control film refers to a film in which a certain light diffusion state is shown in a predetermined range of incident angle (hereinafter, may be referred to as "light diffusion incident angle domain"), and in an incident angle range that deviates from the light diffusion incident angle domain, the incident light is directly transmitted or shows a light diffusion state that is different from the light diffusion state shown in the light diffusion incident angle domain.

Regarding such a light diffusion control film, several types are known; however, for example, a light diffusion control film having a louver structure, in which a plurality of plate-shaped regions having different refractive indices are alternately arranged in any one direction along the film plane, is widely used.

That is, JP 2005-316354 A discloses a rear projection screen formed by laminating a plurality of sheets of a light control film (light diffusion control film), in which the haze value is angle-dependent, and the light diffusion angle range that presents a haze value of 60% or higher when light is incident at an angle of 0° to 180° with respect to the surface is 30° or greater.

Furthermore, according to JP 2005-316354 A, as illustrated in FIG. 24A and FIG. 24B since a light diffusion control film is produced by irradiating a photocurable resin composition film 320 that is transported by a conveyor 310, with light from a rod-shaped light source lamp 315 through slits 313, it is understood that the light diffusion control film thus obtainable is a light diffusion control film of a type having the above-mentioned louver structure.

Furthermore, regarding the mode of lamination of the light diffusion control film, as illustrated in FIG. 25, a mode in which the films are laminated such that the light scattering angle ranges almost perpendicularly intersect, and the like have been disclosed.

SUMMARY OF THE INVENTION

However, the rear projection screen described in JP 2005-316354 A is configured such that the light diffusion control film used therein merely has a louver structure with a single angle of inclination as the internal structure. Therefore, there is a problem that when 3 to 4 sheets of the light diffusion control film are simply laminated, it is difficult to diffuse incident light coming from a wide angle sufficiently.

Particularly, rear projection screens are expected to be applied to applications that have large-sized screens and are viewed at the same time by many viewers, for example, digital signage.

However, in a case in which incident light coming from a wide angle may not be sufficiently diffused, the viewing angle is inevitably narrowed, and it will be difficult to apply the rear projection screens to the relevant applications.

When the number of laminated sheets of a light diffusion control film is further increased in order to effectively diffuse incident light coming from a wide angle, there is a problem that as the thickness of the laminate thus obtainable increases, the degree of sharpness of the images thus obtainable is decreased, and blurred images are likely to be produced.

Furthermore, the production process becomes excessively complicated as the number of laminated sheets increases, so that the production efficiency is decreased, and also, there is a problem that it is highly economically disadvantageous.

Thus, the inventors of the present invention conducted a thorough investigation under such circumstances as described above, and as a result, the inventor found that when a plurality of sheets of a light diffusion control film having predetermined internal structures in the film are laminated, and the laminate is used as a light diffusion control plate, incident light coming from a wide angle can be effectively diffused, despite that the number of laminated sheets of the light diffusion control film is small, such as 3 to 4 sheets.

It was found that when such a predetermined light diffusion control plate is used, a rear projection screen having a wide viewing angle even in a case in which the light diffusion control plate is applied to a large-sized screen can be obtained. It was also found that when such a light diffusion control plate is used, a front projection screen presenting similar effects is also obtained. Thus, the inventors completed the present invention.

That is, an object of the invention is to provide a projection screen, with which incident light coming from a wide angle can be effectively diffused despite that the number of laminated sheets of a light diffusion control film is small such as 3 to 4 sheets, and thereby a wide viewing angle can be obtained even in a case in which the light diffusion control film is applied to a large-sized screen.

According to an aspect of the invention, there is provided a projection screen comprising a light diffusion control plate, the light diffusion control plate being formed by laminating a plurality of sheets of a light diffusion control film, the light diffusion control film being a light diffusion control film having a single light diffusion layer having a first internal structure for anisotropically diffusing incident light and a second internal structure for isotropically diffusing incident light, sequentially from the lower part along the film thickness direction, in which the first internal structure is a louver structure formed by alternately arranging a plurality of plate-shaped regions having different refractive indices in any one direction along the film plane, and the second internal structure is a columnar structure formed by arranging a plurality of pillar-shaped objects with a relatively high refractive index so as to stand close together along the film thickness direction within a region with a relatively low refractive index. Thus, the problems described above can be solved.

That is, when the projection screen of the invention is used, since a light diffusion control film having a single light diffusion layer formed from predetermined internal structures within the film is used as a light diffusion control film that constitutes the light diffusion control plate, despite that the number of laminated sheets of the light diffusion control film is small, such as 3 to 4 sheets, incident light coming from a wide angle can be effectively diffused, and even in a case in which the projection screen is applied to a large-sized screen, a wide viewing angle can be obtained.

Meanwhile, the term "projection screen" means a screen on which an image is displayed, as light from a projector is illuminated against a projection display.

Furthermore, the term "single layer" means that a plurality of light diffusion control film is not limited.

Upon configuring the projection screen of the invention, it is preferable that a plurality of sheets of the light diffusion control film that constitutes the light diffusion control plate are laminated such that incident light coming from a projector enters through the second internal structure side with respect to each of the light diffusion control films.

When the projection screen is configured as such, the incident light coming from a projector can be diffused more uniformly without depending on the incident angle.

Furthermore, upon configuring the projection screen of the invention, it is preferable that the projection screen has an overlapping internal structure in which the position of the upper end portion of the first internal structure and the position of the lower end portion of the second internal structure overlap each other in the film thickness direction.

When the projection screen is configured as such, incident light being directly transmitted and thereby straight-traveling transmitted light being incorporated into the diffused light can be effectively suppressed, and uniformity of the intensity of diffused light can be enhanced, as compared to the case in which an internal structure-unformed area exists between the respective internal structures.

Upon configuring the projection screen of the invention, it is preferable that the thickness of the overlapping internal structure is adjusted to a value within the range of 1 to 40 μm.

When the projection screen is configured as such, since incident light is directly transmitted, incorporation of straight-traveling transmitted light into diffused light can be more effectively suppressed, and uniformity of the intensity of diffused light can be enhanced.

Furthermore, upon configuring the projection screen of the invention, it is preferable that the angle of inclination θ1 of a plurality of plate-shaped regions having different refractive indices in the first internal structure with respect to the normal line of the film plane is adjusted to a value within the range of 0° to 80°, and the angle of inclination θ2 of a plurality of pillar-shaped objects having a relatively high refractive index in the second internal structure with respect to the normal line of the film plane is adjusted to a value within the range of 0° to 45°.

When the projection screen is configured as such, incident light coming from a wide angle can be diffused more effectively.

Upon configuring the projection screen of the invention, it is preferable that a plurality of the plate-shaped regions in the first internal structure has a bent part at an intermediate point along the film thickness direction.

When the projection screen is configured as such, incident light coming from a wide angle can be diffused more effectively.

Meanwhile, the term "intermediate point" means the center point that is at equal distances from two ends, as well as any one point in the middle of the two ends.

Upon configuring the projection screen of the invention, it is preferable that a plurality of sheets of the light diffusion control film are composed of a first sheet of the light diffusion control film, a second sheet of the light diffusion control film, and a third sheet of the light diffusion control film, all having the same configuration, and the sheets of the light diffusion control film are laminated such that the directions of exit of the first to third sheets of the light diffusion control film are different from one another.

When the projection screen is configured as such, incident light coming from a wide angle can be diffused more effectively in various directions in the projection screen plane.

In a case in which a plurality of plate-shaped regions that constitute a louver structure as the first internal structure are inclined, it has been confirmed that due to such inclination, deviation occurs in the exit direction of anisotropically diffused light originating from the first internal structure (also the same in the case in which a plurality of pillar-shaped objects that constitute a columnar structure as the second internal structure, are inclined).

The term "direction of exit" according to the invention means the direction of deviation in such an exit direction.

Furthermore, even with the same light diffusion control films, if light is caused to enter from opposite sides, the directions of exit are reverse directions.

Upon configuring the projection screen of the invention, it is preferable that when the projection screen is installed parallel to the vertical direction, a first light diffusion control film having a direction of exit that faces downwards, a second light diffusion control film having a direction of exit that faces laterally, and a third light diffusion control film having a direction of exit that is reverse to that of the second light diffusion control film, are laminated in order from the side through which incident light coming from a projector enters.

When the projection screen is configured as such, incident light coming from a wide angle can be diffused more effectively in the downward direction and the transverse direction in the projection screen.

Upon configuring the projection screen of the invention, it is preferable that a light diffusion control film having a columnar structure only as an internal structure is further laminated as a fourth light diffusion control film on a surface of the third light diffusion control film, the surface being on the opposite side of the side where the second light diffusion control film is laminated.

When the projections screen is configured as such, uniformity of the intensity of diffused light can be further enhanced.

Furthermore, upon configuring the projection screen of the invention is configured, it is preferable that the thickness of the light diffusion control plate is adjusted to a value within the range of 186 to 3,600 μm.

When the projection screen is configured as such, incident light coming from a projector can be diffused more uniformly without depending on the angle of incidence, while suppressing the occurrence of blurred images.

BRIEF DESCRIPTION OF THE DRAWINGS

FIG. 2 is a diagram provided to explain the light diffusion characteristics of the light diffusion control film having predetermined internal structures according to the invention;

FIG. 3 is a diagram provided to explain the light diffusion characteristics in a case in which a plurality of sheets of the light diffusion control film having predetermined internal structures according to the invention are laminated;

FIG. 7 is a diagram provided to explain the angle of irradiation of active energy radiation;

FIGS. 11A and 11B are diagrams provided to explain the configuration and the light diffusion characteristics of the rear projection screen of Example 2;

FIG. 14 is a diagram provided to explain a schematic cross-sectional view of the light diffusion control film used in Example 3, the film having a bent louver-columnar structure;

FIGS. 16A and 16B are diagrams provided to explain the configuration and the light diffusion characteristics of the rear projection screen of Example 5;

FIG. 25 is another diagram provided to explain a conventional rear projection screen.

DETAILED DESCRIPTION OF THE PREFERRED EMBODIMENTS

Embodiments of the present invention relate to a projection screen comprising a light diffusion control plate, the light diffusion control plate being formed by laminating a plurality of sheets of a light diffusion control film, the light diffusion control film being a light diffusion control film having a single light diffusion layer having a first internal structure for anisotropically diffusing incident light and a second internal structure for isotropically diffusing incident light, sequentially from the lower part along the film thickness direction, in which the first internal structure is a louver structure formed by alternately arranging a plurality of plate-shaped regions having different refractive indices in any one direction along the film plane, and the second internal structure is a columnar structure formed by arranging a plurality of pillar-shaped objects having a relatively high refractive index so as to stand close together along the film thickness direction within a region having a relatively low refractive index.

Hereinafter, embodiments of the invention will be specifically explained with reference to the drawings as appropriate.

1. Light Diffusion Control Film
(1) Basic Configuration

Figure 1A:
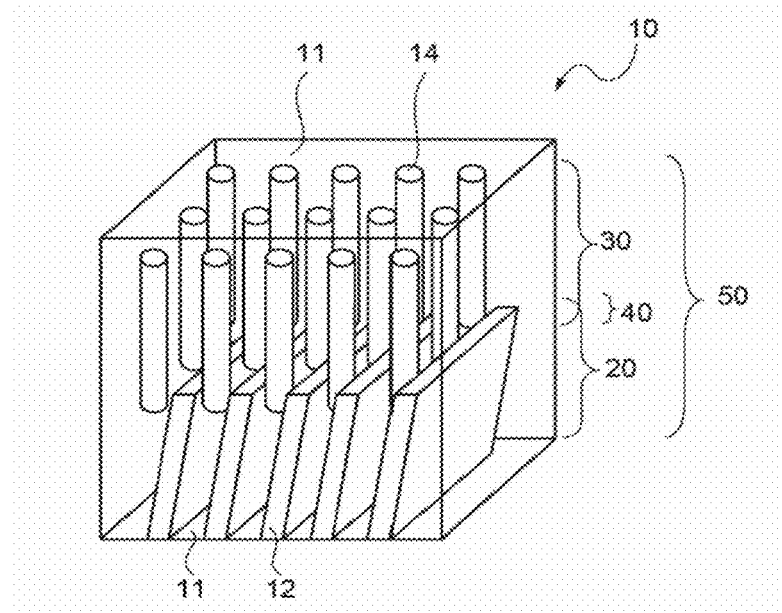
FIGS. 1A and 1B are diagrams provided to explain the configuration of a light diffusion control film having predetermined internal structures according to the invention.
Figure 1B:
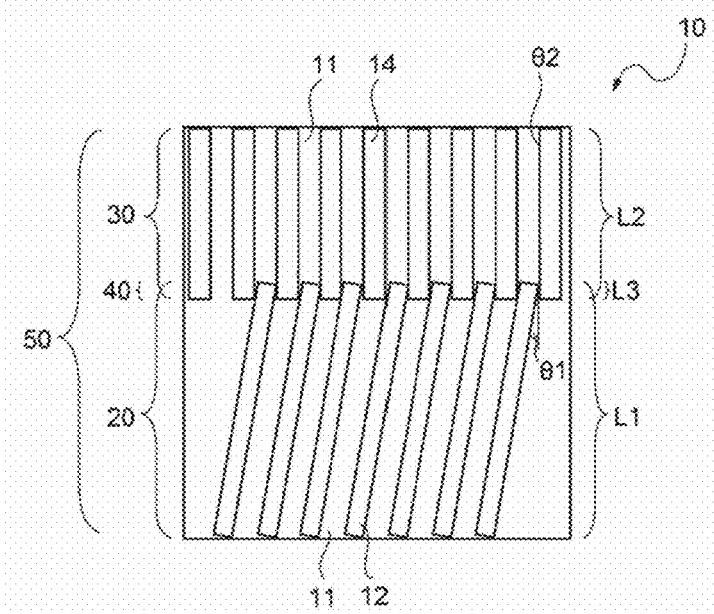

First, the basic configuration of a light diffusion control film 10 having predetermined internal structures (20 and 30) according to the invention will be specifically explained using FIGS. 1A and 1B.

Here, FIG. 1A presents a perspective view illustrating the entirety of the light diffusion control film having predetermined internal structures (20 and 30), and FIG. 1B presents a cross-sectional view of the light diffusion control film 10 having predetermined internal structures (20 and 30).

As illustrated in such FIGS. 1A and 1B, the light diffusion control film 10 having predetermined internal structures (20 and 30) is a light diffusion control film 10 having a single light diffusion layer 50 having a first internal structure 20 for anisotropically diffusing incident light and a second internal structure 30 for isotropically diffusing incident light, sequentially from the lower part along the film thickness direction.

More specifically, the first internal structure 20 is a louver structure 20 formed by alternately arranging a plurality of plate-shaped regions having different refractive indices (plate-shaped regions 11 having a relatively low refractive index and plate-shaped regions 12 having a relatively high refractive index) in any one direction along the film plane, and the second internal structure 30 is a columnar structure 30 formed by arranging a plurality of pillar-shaped objects 14 having a relatively high refractive index so as to stand close together along the film thickness direction within a region 11 having a relatively low refractive index.

Meanwhile, the first internal structure 20 can also be construed as an internal structure formed by arranging a plurality of plate-shaped regions 12 having a relatively high refractive index in parallel along the film thickness direction within a region 11 having a relatively low refractive index.

(2) Light Diffusion Characteristics

Next, the light diffusion characteristics of the light diffusion control film 10 having predetermined internal structures (20 and 30) according to the invention will be specifically explained using FIG. 2.

Here, FIG. 2 presents the light diffusion characteristics of the light diffusion control film 10 having the first internal structure 20 and the second internal structure 30 according to the invention in the case of causing light to enter through a lateral side of the second internal structure 30, separately in a stage of diffusing light by means of the second internal structure 30 only, and a stage of further diffusing the light that has been diffused by means of the second internal structure 30, by means of the first internal structure 20.

As illustrated in such FIG. 2, since the columnar structure 30 as the second internal structure has a property of isotropically diffusing incident light, the diffused light from the stage of diffusing light by means of the second internal structure 30 only is projected into a circular shape on the paper plane that is parallel to the light diffusion control film.

In FIG. 2, the unit for the axis of ordinate and the axis of abscissa in the coordinate system shown in the paper plane that is parallel to the light diffusion control film is the angle (°), and the coordinates mean the exit angle of diffused light in various directions.

Meanwhile, since the louver structure 20 as the first internal structure has a property of anisotropically diffusing incident light, the diffused light that has been diffused by means of the first internal structure 20 only is projected into a straight line shape on the paper plane that is parallel to the light diffusion control film (not shown in the diagram).

Therefore, as illustrated in FIG. 2, the diffused light obtained in the stage in which the light that has been diffused by means of the second internal structure 30, is further diffused by means of the first internal structure 20, that is, the diffused light that has been diffused by means of the light diffusion control film 10 having predetermined internal structures (20 and 30) according to the invention, is projected into a bullet shape facing right to the paper plane, on the paper plane that is parallel to the light diffusion control film.

More specifically, since the upper edges of the plate-shaped regions (11 and 12) that constitute the first internal structure 20 are inclined to the right side of the paper plane, the right half in the paper plane of the circular-shaped diffused light produced by the second internal structure 30 is such that the direction of progress thereof is different from the angle of inclination of the plate-shaped regions (11 and 12) by a predetermined angle or greater.

Therefore, the right half in the paper plane of the circular-shaped diffused light produced by the second internal structure 30 is directly transmitted through the first internal structure 20.

On the other hand, the left half in the paper plane of the circular-shaped diffused light produced by the second internal structure 30 is such that the direction of progress thereof approximates the angle of inclination of the plate-shaped regions (11 and 12) by a predetermined angle or greater. Therefore, the left half in the paper plane is anisotropically diffused, by means of the first internal structure 20, into a shape that is extended in the horizontal direction in the paper plane (hereinafter, such a direction of anisotropic diffusion may be expressed as "direction of anisotropic diffusion (ID): ⇔").

In the following description, as such, the characteristics by which the distinction between the light diffusion incident angle domain and another incident angle domain can be made clear may be referred to as "incident angle dependency".

According to the present specification, the symbol "⇔" means the horizontal direction in the paper plane, the symbol "←" means the leftward direction in the paper plane, the symbol "→" means the rightward direction in the paper plane, the symbol "●" means the forward direction in the paper plane, and the symbol "○" means the backward direction in the paper plane.

Furthermore, not only that, such diffused light that has been anisotropically diffused exits in a direction deviated to the left side of the paper plane, due to the inclination of the plate-shaped regions (11 and 12).

This is expressed, using the terms defined in the invention, as "exiting in a direction of exit facing left in the paper plane" (hereinafter, such a direction of the direction of exit may be expressed as "direction of exit (PD): ←").

Based on the above-described mechanism, as illustrated in FIG. 2, the diffused light that has been diffused by light diffusion control film 10 having predetermined internal structures (20 and 30) according to the invention is projected into a bullet shape on the paper plane that is parallel to the light diffusion control film 10.

Next, the light diffusion characteristics obtainable in the case of laminating a plurality of sheets of the light diffusion control film 10 having predetermined internal structures (20 and 30) according to the invention will be explained using FIG. 3.

Here, FIG. 3 shows the light diffusion characteristics obtainable in a case in which light is caused to enter a laminate formed by laminating a light diffusion control film 10 having the predetermined internal structures (20 and 30) illustrated in FIG. 2 (ID: ⇔, PD: ←), the same light diffusion control film 10 (ID: ⇔, PD: →), and the same light diffusion control film 10 (ID: ●, PD: ●), through a lateral side of the second internal structure 30 in the respective light diffusion control films 10.

More specifically, the light diffusion characteristics of the laminate are shown separately in a stage of diffusing light by means of the second internal structure 30 and a stage of further diffusing the diffused light by means of the first internal structure 20, for each of the light diffusion control films 10.

First, as illustrated in (i) of FIG. 3, the columnar structure 30 as the second internal structure in the light diffusion control film 10 of the top layer diffuses light incident from a light source into a circular shape.

Next, as illustrated in (ii) of FIG. 3, the louver structure 20 as the first internal structure in the light diffusion control film 10 of the top layer diffuses the lower half in the paper plane of the circular-shaped diffused light that has entered the structure, in the downward direction from the paper plane, and the louver structure 20 diffuses light generally into a bullet shape facing upward in the paper plane.

Next, as illustrated in (iii) of FIG. 3, the columnar structure 30 as the second internal structure in the light diffusion control film 10 of the middle layer diffuses the light of the portion with strong straight-traveling properties in the light that has entered the light diffusion control plate and has been diffused into a bullet shape facing upward in the paper plane, that is, the light in the vicinity of the center of the coordinate system, into a circular shape.

The outline of the diffused light at this time is still a bullet shape facing upward in the paper plane.

Next, as illustrated in (iv) of FIG. 3, the louver structure 20 as the first internal structure in the light diffusion control film 10 of the middle layer diffuses the light that has entered the light diffusion control plate and has been diffused into a bullet shape facing upward in the paper plane, in the rightward direction in the paper plane, and the louver structure 20 diffuses light generally into a quadrilateral shape with only the upper left corner in the paper plane being rounded.

Next, as illustrated in (v) of FIG. 3, the columnar structure 30 as the second internal structure in the light diffusion control film 10 of the lowermost layer diffuses the light of the portion with strong straight-traveling properties in the light that has entered the light diffusion control plate and has been diffused into a quadrilateral shape with only the upper left corner in the paper plane being rounded, that is, the light in the vicinity of the center of the coordinate system, into a circular shape.

The outline of the diffused light at this time is still a quadrilateral shape with only the upper left corner in the paper plane being rounded.

Next, as illustrated in (vi) of FIG. 3, the louver structure 20 as the first internal structure in the light diffusion control film 10 of the lowermost layer diffuses the light that has entered the light diffusion control plate and has been diffused into a quadrilateral shape with only the upper left corner in the paper plane being rounded, in the leftward direction in the paper plane, and the louver structure 20 diffuses light generally into a horizontally long rectangular shape occupying the lower half of the coordinate system.

Based on the above-described mechanism, as illustrated in FIG. 3, the light diffused by a laminate that is formed by laminating a plurality of sheets of a light diffusion control film 10 having predetermined internal structures (20 and 30) is projected into a horizontally long rectangular shape in the paper plane that is parallel to the laminate, as a result of laminating sheets of the light diffusion control film in predetermined modes.

In this case, light is not diffused in the upper half of the coordinate system; however, for example, in the case of digital signage installed at the rooftop of a building, it is acceptable as long as the screen is visible from the front, left, right, and lower sides of the screen, and the occasion in which the screen is viewed from the upper side is not conceived. Therefore, there is no problem for practical use in that regard.

In contrast, when diffusion into unnecessary directions is cut off, the luminance of the light diffused into necessary directions is increased, and therefore, the brightness of the displayed image can be effectively increased.

However, if more sheets of the light diffusion control film are laminated, it is also possible to realize diffusion in all directions.

Thus, when a light diffusion control film 10 having predetermined internal structures (20 and 30) is used, when sheets of the light diffusion control film are laminated in a predetermined mode, incident light can be effectively diffused even with a laminate of three sheets at the minimum, as illustrated in (vi) of FIG. 3.

In FIG. 3, the case in which light is incident at an angle that is perpendicular to the surface of the laminate has been explained as an example, for convenience. However, as will be specifically described in the Examples, the excellent light diffusion characteristics of such a laminate are stably manifested for incident light coming from a wide angle.

Such effects are attributed particularly to the fact that the second internal structure 30 can efficiently diffuse incident light coming from a wide angle, and the direction of inclination of the first internal structure 20 controls this.

To specifically explain the light diffusion characteristics of the columnar structure, the columnar structure has a light diffusion incident angle domain in which crescent-shaped diffusion occurs, in addition to the light diffusion incident angle domain in which isotropic diffusion occurs, and thus, the columnar structure is characterized in that the comprehensive range of the light diffusion incident angle domain is very wide (for example, see the light diffusion characteristics of the light diffusion control film having a columnar structure only, as illustrated in FIG. 19).

Therefore, when the light diffusion control film 10 having predetermined internal structures (20 and 30) is used, by laminating 3 to 4 sheets of the film are laminated in a predetermined mode, incident light coming from a wide angle can be diffused effectively.

From this, it is understood that the light diffusion control film 10 having predetermined internal structures (20 and 30) is a light diffusion control film suitable for producing a projection screen having a wide viewing angle that is applicable to large-sized screens.

(3) First Internal Structure

The first internal structure of the light diffusion control film according to the invention is an internal structure for anisotropically diffusing incident light as illustrated in FIG. 1A, and specifically, the first internal structure is a louver structure 20 formed by alternately arranging a plurality of plate-shaped regions (11 and 12) having different refractive indices in any one direction along the film plane.

The reason for this is that when the louver structure 20 is employed as the first internal structure, as illustrated in FIG. 2, the light diffusion characteristics thus obtainable can be imparted with a direction of anisotropic diffusion (ID) or a direction of exit (PD).

As a result, along with the effects of the columnar structure 30 as the second internal structure, when sheets of a predetermined light diffusion control film 10 are laminated in a predetermined mode as illustrated in FIG. 3, excellent light diffusion characteristics suitable for large-sized projection screens can be obtained.

(3)-1 Refractive Index

In the louver structure, it is preferable that the difference between the refractive index of the plate-shaped regions having a relatively high refractive index and the refractive index of the plate-shaped regions having a relatively low refractive index is adjusted to a value of 0.01 or greater.

The reason for this is that if such a difference in the refractive index has a value of below 0.01, since the angle range in which total reflection of incident light within the louver structure is narrowed, the incident angle dependency may be excessively lowered.

Therefore, it is more preferable that the lower limit of such a difference in the refractive index is adjusted to a value of 0.03 or greater, and even more preferably to a value of 0.1 or greater.

It is more preferable if such a difference in the refractive index is larger; however, from the viewpoint of selecting a material capable of forming a louver structure, it is considered that the upper limit is about 0.3.

(3)-2 Width

Furthermore, in regard to the louver structure 20 illustrated in FIG. 1A, it is preferable that the width of the plate-shaped regions 12 having a relatively high refractive index and the width of the plate-shaped regions 11 having a relatively low refractive index are respectively adjusted to a value within the range of 0.1 to 15 μm.

The reason for this is that if such a width has a value of below 0.1 μm, it may be difficult for the light diffusion control film to show light diffusion characteristics, irrespective of the angle of incidence of incident light. On the other hand, if such a width has a value of above 15 μm, the amount of light that travels straight through the louver structure increases, and the uniformity of light diffusion may be deteriorated.

Therefore, in regard to the louver structure, it is more preferable that the lower limit of such a width is adjusted to a value of 0.5 μm or greater, and even more preferably to a value of 1 μm or greater.

Furthermore, in regard to the louver structure, it is more preferable that the upper limit of such a width is adjusted to a value of 10 μm or less, and even more preferably to a value of 5 μm or less.

The widths of the plate-shaped regions having a relatively high refractive index and the plate-shaped regions having a relatively low refractive index can be calculated by making an observation of the film with a digital optical microscope.

(3)-3 Thickness

Furthermore, it is preferable that the thickness (length in the film thickness direction) of the louver structure 20 illustrated in FIG. 1A, that is, length L1 in FIG. 1B, is adjusted to a value within the range of 30 to 500 μm.

The reason for this is that if such length L1 has a value of below 30 μm, the amount of incident light that travels straight through the louver structure increases, and it may be difficult to obtain a sufficient range of light diffusion characteristics. Meanwhile, it is because if such length L1 has a value of above 500 μm, when a louver structure is formed by irradiating a composition for a light diffusion control film with active energy radiation, the direction of progress of photopolymerization is diffused by the louver structure formed in the beginning, and it may be difficult to form a desired louver structure.

Therefore, it is more preferable that the lower limit of the length L1 of the louver structure is adjusted to a value of 50 μm or greater, and even more preferably to a value of 70 μm or greater.

Furthermore, it is more preferable that the upper limit of the length L1 of the louver structure is adjusted to a value of 325 μm or less, and even more preferably to a value of 200 μm or less.

Meanwhile, the "range of light diffusion characteristics" means the range of angle of incidence that shows incident angle dependency, and the range of spread of the diffused light.

(3)-4 Angle of Inclination

In regard to the louver structure 20 illustrated in FIG. 1A, it is preferable that plate-shaped regions (11 and 12) having different refractive indices are arranged to be parallel at a constant angle of inclination with respect to the film thickness direction.

The reason for this is that when the angle of inclination of the plate-shaped regions having different refractive indices is made constant, incident angle can be reflected more stably in the louver structure, and the incident angle dependency originating from the louver structure can be further enhanced.

More specifically, as illustrated in FIG. 1B, it is preferable that in regard to the louver structure 20, the angle of inclination θ1 of the plate-shaped regions (11 and 12) having different refractive indices with respect to the normal line of the film plane is adjusted to a value within the range of 0° to 80°.

The reason for this is that if such an angle of inclination θ1 has a value of above 80°, since the absolute value of the incident angle of active energy radiation also increases with the angle of inclination, the proportion of reflection of the active energy radiation at an interface between air and the coating layer increases, and at the time of forming a louver structure, there is a need to irradiate the louver structure with active energy radiation at a higher illumination. Meanwhile, if such an angle of inclination θ1 has an excessively small value, it may be difficult to impart the direction of exit (PD) to the light diffusion characteristics thus obtainable.

Therefore, it is more preferable that the lower limit of such an angle of inclination θ1 is adjusted to a value of 5° or greater, and even more preferably to a value of 10° or greater.

Furthermore, it is more preferable that the upper limit of such an angle of inclination θ1 is adjusted to a value of 60° or less, and even more preferably to 1 value of 40° or less.

The angle of inclination θ1 means the angle of a narrower side between the angles measured in a cross-section obtainable in the case of cutting a film at a plane that is perpendicular to the film plane and orthogonally intersects the direction of extension traversing the plate-shaped regions extending in any one direction along the film plane, the angles being formed by the normal line with respect to the film surface and the top of the plate-shaped regions (this definition is also applicable to θ1a and θ1b that will be described below).

(3)-5 Bending

Figure 4A:
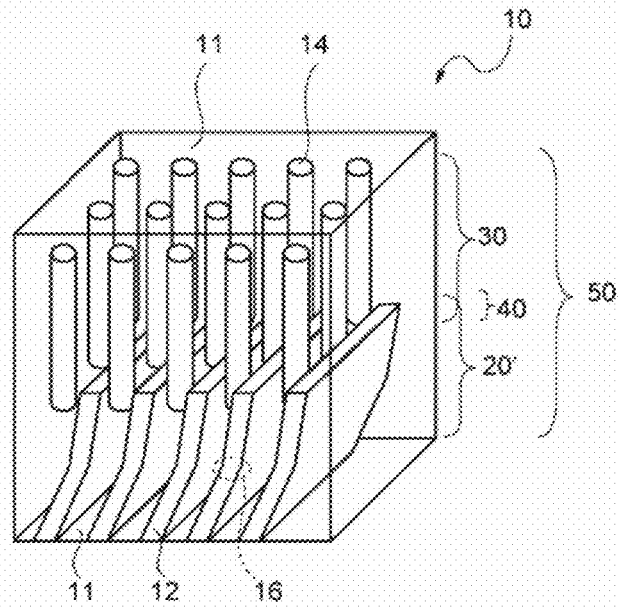
FIGS. 4A and 4B are other diagrams provided to explain the configuration of the light diffusion control film having predetermined internal structures according to the invention.

As illustrated in FIG. 4A, it is preferable that a plurality of the plate-shaped regions (11 and 12) in the first internal structure constitute a bent louver structure 20' having a bent portion 16 at an intermediate point along the film thickness direction.

The reason for this is that when such a bent portion is provided, incident light coming from a wide angle can be more effectively diffused.

Figure 4B:
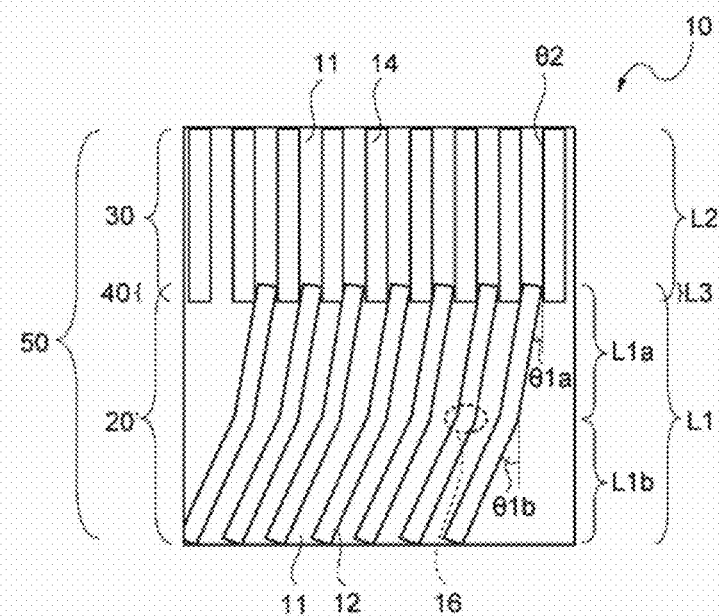

It is preferable that in the bent louver structure 20' illustrated in FIG. 4A, the length in the film thickness direction of the plate-shaped regions (11 and 12) in the area upper to the bent portion 16 (area on the side irradiated with active energy radiation when the light diffusion control film is produced, with respect to the bent portion), that is, the length L1a in FIG. 4B, is adjusted to a value within the range of 15 to 475 μm.

The reason for this is that if such length L1a has a value of below 15 μm, diffusion originating from the plate-shaped regions in the upper area becomes too weak, and it may be difficult to effectively extend the range of the light diffusion characteristics. Meanwhile, as the content of an ultraviolet absorber in the composition for a light diffusion control film is larger, such a length tends to be shortened. Therefore, in other words, when it is said that such a length is excessively short, the content of the ultraviolet absorber becomes very large, and in that case, the possibility that shrinkage wrinkles of the film may be generated increases when the composition for a light diffusion control film is cured, so that control is made difficult. On the other hand, if such length L1a has a value of above 475 μm, the content of the ultraviolet absorber becomes very small, and in that case, the plate-shaped regions in the lower area are not sufficiently formed, while there is a possibility that it may be difficult to effectively extend the range of the light diffusion characteristics.

Therefore, it is more preferable that in the bent louver structure, the lower limit of the length L1a of the plate-shaped regions in the area upper to the bent portion is adjusted to a value of 25 μm or greater, and even more preferably to a value of 30 μm or greater.

Furthermore, it is more preferable that in the bent louver structure, the upper limit of the length L1a of the plate-shaped regions in the area upper to the bent portion is adjusted to a value of 300 μm or less, and even more preferably to a value of 150 μm or less.

Furthermore, it is preferable that in the bent louver structure 20' illustrated in FIG. 4A, the length in the film thickness direction of the plate-shaped regions (11 and 12) in the area lower than the bent portion 16 (area on the opposite side of the above-described upper area with respect to the bent portion), that is, the length L1b in FIG. 4B, is adjusted to a value within the range of 15 to 475 μm The reason for this is that if such length L1b has a value of below 15 μm, diffusion originating from the louver structure in the lower area becomes too weak, and it may be difficult to effectively extend the range of the light diffusion characteristics. On the other hand, it is because if such length L1b has a value of above 475 μm, diffusion originating from the louver structure in the lower area can be sufficiently obtained; however, the film thickness of the light diffusion control film may become excessively large.

Therefore, it is more preferable that in the bent lover structure, the lower limit of the length L1b of the plate-shaped regions in the area lower to the bent portion is adjusted to a value of 25 μm or greater, and even more preferably to a value of 30 μm or greater.

Furthermore, it is more preferable that in the bent louver structure, the upper limit of the length L1b of the plate-shaped regions in the area lower to the bent portion is adjusted to a value of 300 μm or less, and even more preferably to a value of 150 μm or less.

Furthermore, as illustrated in FIG. 4B, it is preferable that in the bent louver structure 20', the angle of inclination θ1a of the plate-shaped regions in the area upper to the bent portion 16 with respect to the normal line of the film surface is adjusted to a value within the range of 0° to 60°.

If such angle of inclination θ1a has a value of above 60°, the absolute value of the incident angle of active energy radiation also increases therewith. Thus, the proportion of reflection of the active energy radiation at an interface between air and the coating layer increases, and at the time of forming a louver structure, there is a need to irradiate the louver structure with active energy radiation at a higher illumination. Meanwhile, if such an angle of inclination θ1a has an excessively small value, it may be difficult to impart the direction of exit (PD) to the light diffusion characteristics thus obtainable.

Therefore, it is more preferable that the lower limit of such an angle of inclination θ1a is adjusted to a value of 2° or greater, and even more preferably to a value of 3° or greater.

Furthermore, it is more preferable that the upper limit of such an angle of inclination θ1a is adjusted to a value of 45° or less, and even more preferably to a value of 30° or less.

Furthermore, as illustrated in FIG. 4B, it is preferable that in the bent louver structure 20', the angle of inclination θ1b of the plate-shaped regions in the area lower to the bent portion 16 with respect to the normal line of the film plane is adjusted to a value within the range of 1° to 80°.

The reason for this is that when such an angle of inclination θ1b has a value of below 1°, even if the synergistic effect with the plate-shaped regions in the area upper to the bent portion is considered, it may be difficult to sufficiently obtain an effect of extending the range of the light diffusion characteristics. On the other hand, it is because if such an angle of inclination θ1b has a value of above 80°, when the synergistic effect with the plate-shaped regions in the area upper to the bent portion is considered, the range of the light diffusion characteristics can be sufficiently extended even without further increasing the angle of inclination.

Therefore, it is more preferable that the lower limit of such an angle of inclination θ1b is adjusted to a value of 5° or greater, and even more preferably to a value of 10° or greater.

Furthermore, it is more preferable that the upper limit of such an angle of inclination θ1b is adjusted to a value of 60° or less, and even more preferably to a value of 40° or less.

It is also preferable that the value of θ1b-θ1a in FIG. 4B is adjusted to a value of 1° or greater, more preferably to a value of 2° or greater, and even more preferably to a value of 3° or greater.

It is preferable that the value of θ1b-θ1a is adjusted to a value of 45° or less, more preferably to a value of 30° or less, and even more preferably to a value of 20° or less.

As illustrated in FIG. 4B, the angle of inclination θ1a means an angle on the narrower side between the angles formed by the normal line of the film plane and the top of the plate-shaped regions in the area upper to the bent portion.

The angle of inclination θ1b means an angle on the narrower side between the angles formed by the normal line of the film plane and the top of the plate-shaped regions in the area lower to the bent portion.

(4) Second Internal Structure

The second internal structure in the light diffusion control film of the invention is an internal structure for isotropically diffusing incident light as illustrated in FIG. 1A, and specifically, the second internal structure is a columnar structure 30 formed by arranging a plurality of pillar-shaped objects 14 having a relatively high refractive index to stand close together in the film thickness direction within a region 11 having a relatively low refractive index.

The reason for this is that light entering at a predetermined angle from a light source can be uniformly diffused in advance and then introduced into the first internal structure 20, or diffused light that has become non-uniform as a result of being partially imparted with the direction of anisotropic diffusion (ID) or the direction of exit (PD) by the first internal structure 20, can be uniformly diffused again and then introduced into the next first internal structure 20.

As a result, as illustrated in FIG. 3, in a case in which sheets of a predetermined light diffusion control film 10 are laminated in a predetermined mode, excellent light diffusion characteristics suitable for a large-sized projection screen can be obtained.

(4)-1 Refractive Index

It is preferable that the relation between the refractive index of the pillar-shaped objects having a relatively high refractive index and the refractive index of the region having a relatively low refractive index in the columnar structure, is made similar to the relation between the refractive index of the plate-shaped regions having a relatively high refractive index and the refractive index of the plate-shaped regions having a relatively low refractive index in the louver structure as the first internal structure described above.

(4)-2 Maximum Diameter and Interval

In regard to the columnar structure 30 illustrated in FIG. 1A, it is preferable that the maximum diameter in a cross-section of a pillar-shaped object 14 and the interval between the pillar-shaped objects are adjusted to be similar to the value ranges for the width of the plate-shaped regions in the louver structure as the first internal structure described above.

(4)-3 Thickness

It is also preferable that the thickness (length in the film thickness direction) of the columnar structure 30 illustrated in FIG. 1A, that is, L2 in FIG. 1B, is adjusted to a value within the range of 10 to 200 μm.

The reason for this is that if such length L2 has a value of below 10 μm, the action of uniformizing the light entering directly from a light source or the light diffused by the first internal structure may be achieved insufficiently. On the other hand, it is because if such length L2 has a value of above 200 μm, the existence proportion of the first internal structure becomes excessively small, and it may be difficult to effectively extend the range of the light diffusion characteristics.

Therefore, it is more preferable that the lower limit of the length L2 of the columnar structure is adjusted to a value of 20 μm or greater, and even more preferably to a value of 40 μm or greater.

Furthermore, it is more preferable that the upper limit of the length L2 of the columnar structure is adjusted to a value of 150 μm or less, and even more preferably to a value of 100 μm or less.

(4)-4 Angle of Inclination

For a reason similar to that for the angle of inclination $\theta 1$, it is preferable that the angle of inclination $\theta 2$ of the pillar-shaped objects 14 having a relatively high refractive index in the columnar structure 30 illustrated in FIG. 1B is adjusted to a value within the range of 0° to 45°.

The reason for this is that when such angle of inclination $\theta 2$ has a value within the range of 0° to 45°, the exit direction of the uniformized diffused light can be sufficiently controlled for practical use.

For example, in regard to digital signage, a viewer may view a projection screen from a front position or may view the projection screen from a position shifted to the left or to the right or from a lower position; however, when the angle of inclination $\theta 2$ has a value within the range of 0° to 45°, visibility from these positions can be sufficiently secured for practical use.

Meanwhile, usually, since it is assumed that a viewer views a projection screen from the vicinity of the front face, it is more preferable that the upper limit of such angle of inclination $\theta 1$ is adjusted to a value of 30° or less, and even more preferably to a value of 10° or less.

As illustrated in FIG. 1B, it is preferable that the angles of inclination $\theta 2$ and $\theta 1$ are inclined to the same side (including the angle of inclination of 0°), and the angles of inclination gradually increase in this order.

Furthermore, as illustrated in FIG. 4B, in a case in which the first internal structure is a bent louver structure 20', it is preferable that the angles of inclination $\theta 2$, $\theta 1a$, and $\theta 1b$ are inclined to the same side (including the angle of inclination of 0°), and the angles of inclination gradually increase in this order.

The reason for this is that as the angles of inclination gradually change, the ranges of the light diffusion characteristics originating from the respective internal structures overlap each other, and the final range of the light diffusion characteristics can be extended effectively.

Meanwhile, the angle of inclination $\theta 2$ means the angle on the narrower side between the angles measured in a cross-section in the case of cutting the film at a plane that is perpendicular to the film plane and cuts one entire pillar-shaped object into two along the axial line, the angles being formed by the normal line to the film surface and the top of the pillar-shaped objects.

(5) Overlapping Internal Structure

As illustrated in FIG. 1B, it is preferable that the light diffusion control film 10 according to the present invention has an overlapping internal structure 40 in which the position of the upper end portion of a louver structure 20 as the first internal structure and the position of the lower end portion of the columnar structure 30 as the second internal structure overlap each other in the film thickness direction.

The reason for this is that when the light diffusion control film 10 has an overlapping internal structure, incident light being directly transmitted and thereby straight-traveling transmitted light being incorporated into the diffused light can be effectively suppressed, and uniformity of the intensity of diffused light can be enhanced, as compared to the case in which an internal structure-unformed area exists between the respective internal structures.

Hereinafter, the overlapping internal structure will be specifically explained.

(5)-1 Shape

The overlapping internal structure is not particularly limited as long as the position of the upper end portion of a louver structure as the first internal structure and the position of the lower end portion of a columnar structure as the second internal structure are formed to overlap each other in the film thickness direction.

Figure 5A:
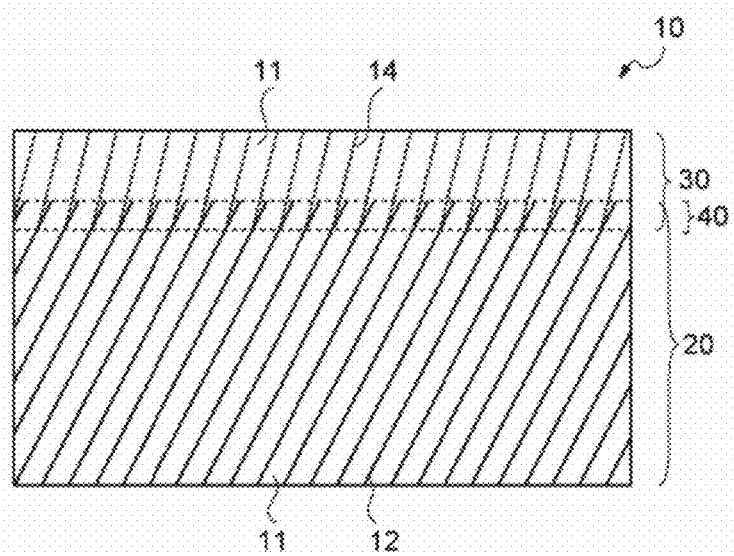
FIGS. 5A and 5B are diagrams provided to explain embodiments of the overlapping internal structure.
Figure 5B:
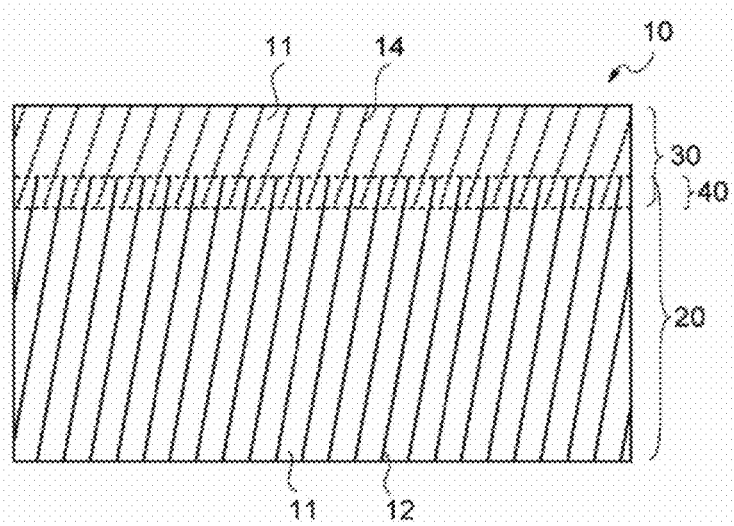

More specifically, as illustrated in FIGS. 5A and 5B, the overlapping internal structure is desirably a structure in which an edge of any one of the regions (12 and 14) having a relatively high refractive index, which originate from the louver structure 20 as the first internal structure and the columnar structure 30 as the second internal structure, respectively, is incorporated into the region 11 having a relatively low refractive index, which originates from the respective other one of the internal structures (30 and 20).

At this time, as illustrated in FIG. 5A, an overlapping internal structure 40 in which an edge of any one of the regions (12 and 14) having a relatively high refractive index, which respectively originate from one of the two internal structures (20 and 30), is in contact with the vicinity of an edge of the other one of the regions (14 and 12) having a relatively high refractive index, which respectively originate from the internal structures (30 and 20), is preferable.

Alternatively, as illustrated in FIG. 5B, an overlapping internal structure 40 in which the regions (12 and 14) having a relatively high refractive index, which respectively originate from the two internal structures (20 and 30), overlap each other in a non-contact state, is also preferable.

Meanwhile, in FIGS. 5A and 5B, the plate-shaped regions 12 having a relatively high refractive index in the louver structure 20 are indicated with solid lines, and the pillar-shaped objects 14 in the columnar structure 30 are indicated with dotted lines.

(5)-2 Difference in Angle of Inclination

It is also preferable that the difference between the angles of inclination (θ1 and θ2) of the regions (12 and 14) having a relatively high refractive index, which originate from the louver structure 20 as the first internal structure and the columnar structure 30 as the second internal structure, respectively, illustrated in FIG. 1B is adjusted to a value of 5° or greater.

The reason for this is that the range of the light diffusion characteristics can be extended more effectively by adjusting such a difference in the angle of inclination to a value of 5° or greater. Meanwhile, if the value of such a difference in the angle of inclination is an excessively large value, the ranges of the light diffusion characteristics attributed to the various internal structures of the light diffusion control film thus obtainable become completely independent, and the overall range of the light diffusion characteristics of the film may not be extended efficiently.

Therefore, it is more preferable that the lower limit of such a difference in the angle of inclination is adjusted to a value of 7° or greater, and even more preferably to a value of 10° or greater.

Furthermore, it is preferable that the upper limit of such a difference in the angle of inclination is adjusted to a value of 35° or less, and more preferably to a value of 20° or less.

When the first internal structure is a bent louver structure as illustrated in FIG. 4A, the angle of inclination θ1 described above can be read as angle of inclination θ1$a$ and applied instead.

(5)-3 Thickness

It is also preferable that the thickness (length in the film thickness direction) L3 of the overlapping internal structure illustrated in FIG. 1B is adjusted to a value within the range of 1 to 40 μm.

The reason for this is that if such length L3 has a value of below 1 μm, incident light is likely to be directly transmitted straight, and it may be difficult to maintain the uniformity of the intensity of diffused light more stably. On the other hand, it is because if such length L3 has a value of above 40 μm, the extraction efficiency for diffused light may be lowered. That is, in a case in which the length of the overlapping internal structure is too long, it is expected that backscattering or the like occurs in that region, and this will bring about a decrease in the extraction efficiency for diffused light.

Therefore, it is more preferable that the lower limit of the length L3 of the overlapping internal structure is adjusted to a value of 3 μm or greater, and even more preferably to a value of 5 μm or greater.

Furthermore, it is more preferable that the upper limit of the length L3 of the overlapping internal structure is adjusted to a value of 35 μm or less, and even more preferably to a value of 30 μm or less.

(6) Total Film Thickness

It is preferable that the total film thickness of the light diffusion control film according to the invention is adjusted to a value within the range of 60 to 700 μm.

The reason for this is that if the total film thickness of the light diffusion control film has a value of below 60 μm, the amount of incident light that travels straight through the internal structures increases, and it may be difficult for the light diffusion control film to exhibit the light diffusion characteristics. On the other hand, it is because if the total film thickness of the light diffusion control film has a value of above 700 μm, when the internal structures are formed by irradiating a composition for a light diffusion control film with active energy radiation, the direction of progress of photopolymerization is diffused by the internal structures formed in the beginning, and it may be difficult to form desired internal structures.

Therefore, it is more preferable that the lower limit of the total film thickness of the light diffusion control film is adjusted to a value of 80 μm or greater, and even more preferably to a value of 100 μm or greater.

Furthermore, it is more preferable that the upper limit of the total film thickness of the light diffusion control film is adjusted to a value of 450 μm or less, and even more preferably to a value of 250 μm or less.

(7) Production Method

It is preferable that the light diffusion control film having the above-mentioned predetermined internal structures is produced according to a production method including the following steps (a) to (d):

(a) a step of preparing a composition for a light diffusion control film, the composition including at least two polymerizable compounds having different refractive indices and a photopolymerization initiator;

(b) a step of applying the composition for a light diffusion control film on a process sheet and forming a coating layer;

(c) a step of subjecting the coating layer to first irradiation with active energy radiation, forming a louver structure as a first internal structure in the lower part of the coating layer, and also leaving an internal structure-unformed region in the upper part of the coating layer; and (d) a step of subjecting the coating layer to second irradiation with active energy radiation and forming a columnar structure as a second internal structure in the internal structure-unformed region.

In the following description, such a production method will be specifically explained with reference to the drawings.

(7)-1 Step (a): Step of Preparing Composition for Light Diffusion Control Film

Step (a) is a step of preparing a predetermined composition for a light diffusion control film.

More specifically, it is preferable that two polymerizable compounds having different refractive indices and the like are stirred under high temperature conditions at 40° C. to 80° C., and thereby a uniform mixed liquid is prepared.

Furthermore, it is preferable to obtain a solution of the composition for a light diffusion control film by further adding a diluting solvent as necessary, so as to obtain a desired viscosity.

In the following description, step (a) will be described more specifically.

(i) (A) High-Refractive Index Polymerizable Compound (i)-1 Refractive Index

It is preferable that the refractive index of a polymerizable compound having a higher refractive index (hereinafter, may be referred to as component (A)) between the two polymerizable compounds having different refractive indices, is adjusted to a value within the range of 1.5 to 1.65.

The reason for this is that if the refractive index of component (A) has a value of below 1.5, the difference between this refractive index and the refractive index of the polymerizable compound having a lower refractive index (hereinafter, may be referred to as component (B)) becomes too small, and it may be difficult to obtain effective light diffusion characteristics. On the other hand, it is because if the refractive index of component (A) has a value of above 1.65, the difference between this refractive index and the refractive index of component (B) becomes large; however, it may be difficult for component (A) to form even an apparently miscible state with component (B).

Therefore, it is more preferable that the lower limit of the refractive index of the component (A) is adjusted to a value of 1.55 or greater, and even more preferably to a value of 1.56 or greater.

Furthermore, it is more preferable that the upper limit value of the refractive index of component (A) is adjusted to a value of 1.6 or less, and even more preferably to a value of 1.59 or less.

The refractive index of component (A) described above means the refractive index of component (A) before being cured by light irradiation.

Furthermore, the refractive index can be measured according to, for example, JIS K0062.

(i)-2 Type

The type of component (A) is not particularly limited; however, examples include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate, and compounds obtained by partially substituting these compounds with halogen, alkyl, alkoxy, halogenated alkyl or the like.

The term "(meth)acrylic acid" means both acrylic acid and methacrylic acid.

It is more preferable that the composition for a light diffusion control film includes a compound containing a biphenyl ring as component (A), and particularly, it is even more preferable that the composition includes a biphenyl compound represented by the following General Formula (1):

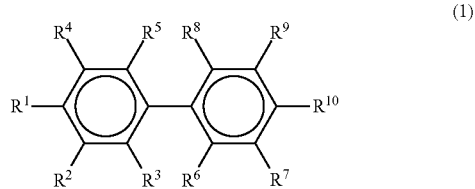

(1)

wherein in General Formula (1), $R^1$ to $R^{10}$ are independent of one another, and at least one of $R^1$ to $R^{10}$ represents a substituent represented by the following General Formula (2), while each of the others represents any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

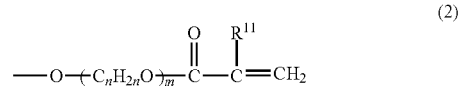

(2)

wherein in General Formula (2), $R^{11}$ represents a hydrogen atom or a methyl group; the number of carbon atoms, n, represents an integer from 1 to 4; and the number of repetitions, m, represents an integer from 1 to 10.

Regarding the reason for this, it is speculated to be because when the composition for a light diffusion control film includes a biphenyl compound having a particular structure as component (A), a predetermined difference is produced between the rates of polymerization of component (A) and component (B), the compatibility between component (A) and component (B) is deteriorated to a predetermined range, and thereby the copolymerizability between the two components can be decreased.

Furthermore, by making the refractive index of the region having a relatively high refractive index, which originates from component (A), the difference between this refractive index and the refractive index of the region having a relatively low refractive index, which originates from component (B), can be regulated more easily to a predetermined value or greater.

Specific examples of the biphenyl compound represented by General Formula (1) include, as preferred examples, compounds represented by the following Formulae (3) and (4):

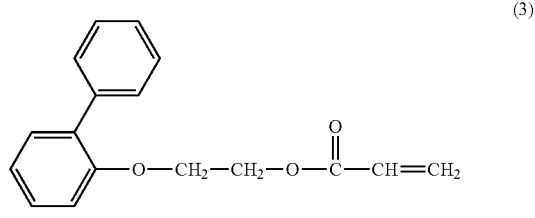

(3)

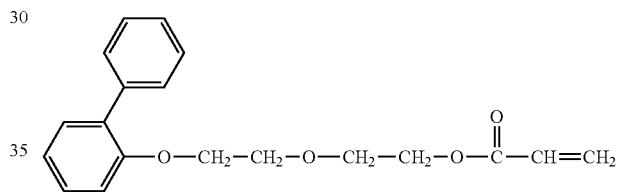

(4)

(i)-3 Content

It is preferable that the content of component (A) in the composition for a light diffusion control film is adjusted to a value within the range of 25 to 400 parts by weight with respect to 100 parts by weight of component (B) that will be described below.

The reason for this is that if the content of component (A) has a value of below 25 parts by weight, the existence ratio of component (A) with respect to component (B) becomes small, and the width of the region having a relatively high refractive index, which originates from component (A), becomes excessively small compared to the width of the region having a relatively low refractive index, which originates from component (B), so that it may be difficult to obtain satisfactory light diffusion characteristics. On the other hand, it is because if the content of component (A) has a value of above 400 parts by weight, the existence ratio of component (A) with respect to component (B) becomes large, and the width of the region having a relatively high refractive index, which originates from component (A), becomes excessively large compared to the width of the region having a relatively low refractive index, which originates from component (B), so that conversely it may be difficult to obtain satisfactory light diffusion characteristics.

Therefore, it is more preferable that the lower limit of the content of component (A) is adjusted to a value of 40 parts by weight or more, and even more preferably to a value of 50 parts by weight or more, with respect to 100 parts by weight of component (B).

Furthermore, it is more preferable that the upper limit of the content of component (A) is adjusted to a value of 300 parts by weight or less, and even more preferably to a value of 200 parts by weight or less, with respect to 100 parts by weight of component (B).

(ii) (B) Low-Refractive Index Polymerizable Compound (ii)-1 Refractive Index

It is preferable that the refractive index of component (B), that is, the polymerizable compound having a lower refractive index between the two polymerizable compounds having two different refractive indices, is adjusted to a value within the range of 1.4 to 1.5.

The reason for this is that if the refractive index of component (B) has a value of below 1.4, the difference between this refractive index and the refractive index of component (A) becomes large; however, the compatibility with component (A) may be so deteriorated that it may be difficult for the components to form predetermined internal structures. On the other hand, it is because if the refractive index of component (B) has a value of above 1.5, the difference between this refractive index and the refractive index of component (A) becomes too small, and it may be difficult to obtain desired light diffusion characteristics.

Therefore, it is more preferable that the lower limit of the refractive index of component (B) is adjusted to a value of 1.45 or greater, and even more preferably to a value of 1.46 or greater.

Furthermore, it is more preferable that the upper limit of the refractive index of component (B) is adjusted to a value of 1.49 or less, and even more preferably to a value of 1.48 or less.

The refractive index of component (B) described above means the refractive index of component (B) before being cured by light irradiation.

Furthermore, the refractive index can be measured according to, for example, JIS K0062.

It is also preferable that the difference between the refractive index of component (A) and the refractive index of component (B) as described above is adjusted to a value of 0.01 or greater.

The reason for this is that if such a difference in the refractive index has a value of below 0.01, since the angle range in which total reflection of incident light occurs within the predetermined internal structures is narrowed, the range of the light diffusion characteristics may become excessively narrow. On the other hand, if such a difference in the refractive index has an excessively large value, the compatibility between component (A) and component (B) may be so deteriorated that it may be difficult for the components to form predetermined internal structures.

Therefore, it is more preferable that the lower limit of the difference between the refractive index of component (A) and the refractive index of component (B) is adjusted to a value of 0.05 or greater, and even more preferably to a value of 0.1 or greater.

Furthermore, it is more preferable that the upper limit of the difference between the refractive index of component (A) and the refractive index of component (B) is adjusted to a value of 0.5 or less, and even more preferably to a value of 0.2 or less.

The refractive indices of component (A) and component (B) as used herein mean the refractive indices of component (A) and component (B) before being cured by light irradiation.

(ii)-2 Type

The type of component (B) is not particularly limited; however, examples include urethane (meth)acrylate, a (meth)acrylic polymer having a (meth)acryloyl group in a side chain, a (meth)acryloyl group-containing silicone resin, and an unsaturated polyester resin. Particularly, urethane (meth)acrylate is preferred.

The reason for this is that when urethane (meth)acrylate is used, the difference between the refractive index of the region having a relatively high refractive index, which originates from component (A), and the refractive index of the region having a relatively low refractive index, which originates from component (B), can be regulated more easily, and also, the fluctuation in the refractive index of the region having a relatively low refractive index, which originates from component (B), can be effectively suppressed, so that a light diffusion control film having predetermined internal structures can be obtained more efficiently.

Meanwhile, the term (meth)acrylate means both acrylate and methacrylate.

(iii) Photopolymerization Initiator

It is preferable that if desired, a photopolymerization initiator as component (C) is incorporated into the composition for a light diffusion control film.

The reason for this is that when a photopolymerization initiator is incorporated, the predetermined internal structures can be formed efficiently at the time of irradiating the composition for a light diffusion control film with active energy radiation.

Here, the photopolymerization initiator refers to a compound that generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxyl-2-propyl) ketone, benzophenone, p-phenylbenzophenone, 4,4-diethylaminobenzophenone, dichlorobenzophenone, 2-methylanthraquinone, 2-ethylanthraquinone, 2-tertiary butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, a p-dimethylaminebenzoic acid ester, and an oligo[2-hydroxy-2-methyl-1-[4-(1-methylvinyl)phenyl]propane]. These compounds may be used singly, or two or more kinds thereof may be used in combination.

In regard to the content in the case of incorporating a photopolymerization initiator, it is preferable that the content is adjusted to a value within the range of 0.2 to 20 parts by weight, more preferably to a value within the range of 0.5 to 15 parts by weight, and even more preferably to a value within the range of 1 to 10 parts by weight, with respect to 100 parts by weight of the total amount of component (A) and component (B).

(iv) Ultraviolet Absorber (iv)-1 Type

Furthermore, it is preferable that the composition for a light diffusion control film includes an ultraviolet absorber as component (D).

The reason for this is that when an ultraviolet absorber is included as component (D), upon irradiating with active energy radiation, active energy radiation having a predetermined wavelength can be selectively absorbed to a predetermined extent.

It is because as a result, a bend may be produced in the louver structure as the first internal structure formed in the film, without inhibiting curing of the composition for a light diffusion control film.

Here, at the present moment, the specific mechanism of how an ultraviolet absorber generates a bend in the louver structure as the first internal structure that is formed within the film, has not been sufficiently elucidated.

However, the mechanism described below is speculated to be applicable.

That is, it has been recognized that as the amount of addition of the ultraviolet absorber is smaller, the bending angle becomes smaller, and the range of the light diffusion characteristics tends to diminish.

Furthermore, it has been recognized that as the ultraviolet absorber has a peak at a site closer to the wavelength of 365 nm, which is the main wavelength of high pressure mercury lamps, a bend is produced with a small amount of addition of the ultraviolet absorber.

Therefore, it is speculated that as much as the wavelength of the ultraviolet radiation emitted from a high pressure mercury lamp is controlled by the ultraviolet absorber, that is, as much as the intensity ratio of various wavelengths in the ultraviolet radiation emitted from a high pressure mercury lamp changes, the progress of polymerization toward the lower part in the film thickness direction of the coating layer is delayed, and there occurs a change in the direction of progress of polymerization at a depth at which polymerization has progressed to a certain extent.

Meanwhile, regarding the factor that changes the direction of progress of polymerization, the difference between the refractive indices of component (A) and component (B) may be considered; however, in such a difference in the refractive index, a bend that is actually recognizable is not produced according to calculations.

Furthermore, it is preferable that component (D) is at least one selected from the group consisting of a hydroxyphenyl-triazine-based ultraviolet absorber, a benzotriazole-based ultraviolet absorber, a benzophenone-based ultraviolet absorber, and a hydroxybenzoate-based ultraviolet absorber.

The reason for this is that when such an ultraviolet absorber is used, since a bend can be produced more clearly in the louver structure as the first internal structure, the range of the light diffusion characteristics in the light diffusion control film thus obtainable can be extended more effectively.

That is, it is because it has been confirmed that when an ultraviolet absorber having a peak at a site closer to the wavelength of 365 nm, which is the main wavelength of high pressure mercury lamps, is used, a bend is produced with a small amount of addition of the ultraviolet absorber.

(iv)-2 Absorption Wavelength

It is also preferable that component (D) has an absorption peak for light having a wavelength of 330 to 380 nm.

The reason for this is that when the absorption peak of component (D) is in this range, component (D) can efficiently absorb energy at 365 nm, which is the main wavelength of high pressure mercury lamps, and thereby, a louver structure having a bend can be efficiently formed in the light diffusion control film thus obtainable.

On the other hand, many of ultraviolet absorbers having absorption peaks at wavelengths of below 330 nm exhibit small absorption at 365 nm. Therefore, even if such an ultraviolet absorber is used, a louver structure having a sufficient bend may not be formed in the light diffusion control film thus obtainable.

Meanwhile, many of ultraviolet absorbers having absorption peaks at wavelengths of above 380 nm reliably exhibit absorption at 365 nm as well. However, since many of such ultraviolet absorbers exhibit absorption in the entire ultraviolet region, in order to realize absorption at 365 nm, it will be necessary to increase the amount of addition. As a result, when an ultraviolet absorber having an absorption peak at a wavelength of above 380 nm is used, curing per se of the light diffusion control film may be inhibited.

Therefore, it is more preferable that the absorption peak for component (D) is adjusted to a wavelength value within the range of 335 to 375 nm, and even more preferably to a wavelength value within the range of 340 to 370 nm.

(iv)-3 Content

It is preferable that the content of component (D) in the composition for a light diffusion control film is adjusted to a value of below 2 parts by weight (provided that 0 parts by weight is excluded) with respect to the total amount (100 parts by weight) of component (A) and component (B).

The reason for this is that when the content of component (D) is adjusted to a value within such a range, a bend can be produced in the louver structure as the first internal structure formed within the film, without inhibiting curing of the composition for a light diffusion control film, and thereby, the range of the light diffusion characteristics of the light diffusion control film thus obtainable can be extended effectively.

That is, it is because if the content of component (D) has a value of 2 parts by weight or more, curing of the composition for a light diffusion control film may be inhibited, and shrinkage wrinkles may be generated at the film surface, or the composition may not be cured at all. On the other hand, if the content of component (D) is excessively small, it may be difficult to produce a sufficient bend in the louver structure as the first internal structure formed within the film.

Therefore, it is more preferable that the lower limit of the content of component (D) is adjusted to a value of 0.01 parts by weight or greater, and even more preferably to a value of 0.02 parts by weight or greater, with respect to the total amount (100 parts by weight) of component (A) and component (B).

Furthermore, it is more preferable that the upper limit of the content of component (D) is adjusted to a value of 1.5 parts by weight or less, and even more preferably to a value of 1 part by weight or less, with respect to the total amount (100 parts by weight) of component (A) and component (B).

(v) Other Additives

Furthermore, other additives can be added to the composition for a light diffusion control film as appropriate, to the extent that the effects of the invention are not impaired.

Examples of the other additives include an oxidation inhibitor, an antistatic agent, a polymerization accelerator, a polymerization inhibitor, an infrared absorber, a plasticizer, a diluting solvent, and a leveling agent.

It is preferable that the content of the other additives is generally adjusted to a value within the range of 0.01 to 5 parts by weight with respect to the total amount (100 parts by weight) of component (A) and component (B).

(7)-2 Step (b): Step of Applying Composition for Light Diffusion Control Film

Figure 6A:
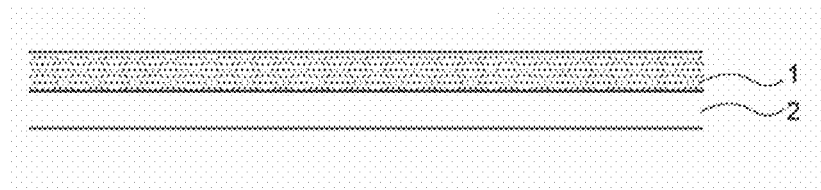
FIGS. 6A to 6C are diagrams provided to explain a method for producing the light diffusion control film having predetermined internal structures according to the invention.

Step (b) is, as illustrated in FIG. 6A, a step of applying the composition for a light diffusion control film thus prepared on a process sheet 2 and thereby forming a coating layer 1.

Regarding the process sheet, plastic films and paper can both be used.

Among these, examples of plastic films include polyester-based films such as a polyethylene terephthalate film; polyolefin-based films such as a polyethylene film and a polypropylene film; cellulose-based films such as a triacetylcellulose film; and polyimide-based films.

Examples of paper include glassine paper, coated paper, and laminated paper.

In consideration of the steps that will be described below, the process sheet 2 is preferably a film having excellent dimensional stability against heat or active energy radiation.

Preferred examples of such a film include, as described above, polyester-based films, polyolefin-based films, and polyimide-based films.

In regard to the process sheet, it is preferable to provide a release layer on a surface of the process sheet, the surface being on the side of the surface coated with the composition for a light diffusion control film, in order to make it easier to release the light diffusion control film thus obtained, from the process sheet after photocuring.

Such a release layer can be formed using a conventionally known release agent, such as a silicone-based release agent, a fluorine-based release agent, an alkyd-based release agent, or an olefin-based release agent.

It is preferable that the thickness of the process sheet is adjusted to a value within the range of, usually, 25 to 200 μm.

Regarding the method of applying the composition for a light diffusion control film on the process sheet, for example, the coating process can be carried out by a conventionally known method such as, for example, a knife coating method, a roll coating method, a bar coating method, a blade coating method, a die coating method, or a gravure coating method.

At this time, it is preferable that the thickness of the coating layer is adjusted to a value within the range of 60 to 700 μm.

(7)-3 Step (c): Step of Performing First Irradiation with Active Energy Radiation Step (c) is, as illustrated in FIG. 6B, a step of subjecting the coating layer 1 to first irradiation with active energy radiation, forming a louver structure 20 as a first internal structure in the lower part of the coating layer 1, and also leaving an internal structure-unformed region 1' in the upper part of the coating layer 1.

Figure 6B:
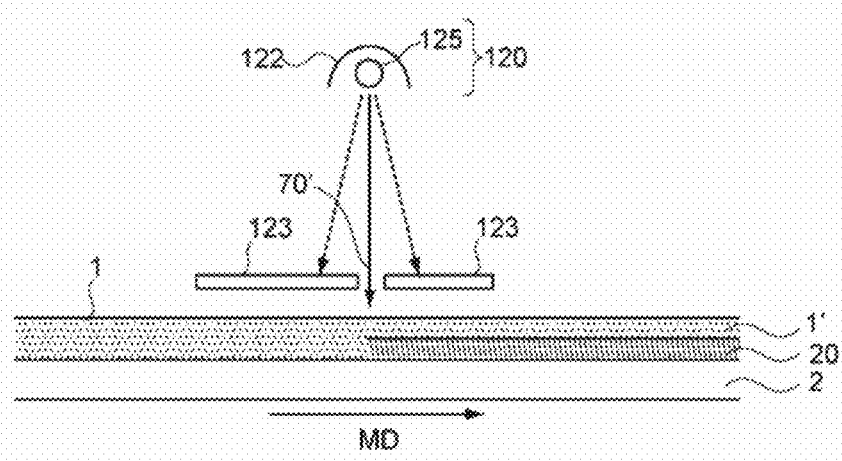

That is, as illustrated in FIG. 6B, the coating layer 1 formed on the process sheet is irradiated with light 70' that is substantially parallel light when viewed from one direction and is seen as non-parallel random light when viewed from another direction.

Such light 70' can be emitted using, for example, a linear light source 125, and in this case, the light is seen as substantially parallel light when viewed from the axial direction of the linear light source 125, and is seen as non-parallel random light when viewed from another direction.

Regarding the angle of irradiation of the emitted light, as illustrated in FIG. 7, it is preferable that the angle of irradiation θx in the case of defining the angle of the normal line to the surface of the coating layer 1 as 0°, is adjusted to a value within the range of, usually, −80° to 80°.

The reason for this is that when the angle of irradiation has a value out of the range of −80° to 80°, the influence of reflection at the surface of the coating layer 1 or the like increases, and it may be difficult to sufficiently form a louver structure.

The arrow MD in FIG. 7 shows the direction of movement of the coating layer.

Furthermore, it is preferable to use ultraviolet radiation as the emitted light.

The reason for this is that in the case of an electron beam, since the rate of polymerization is very fast, component (A) and component (B) do not sufficiently undergo phase separation during the process of polymerization, and it may be difficult for the components to form a louver structure. On the other hand, it is because when compared with visible light or the like, since ultraviolet radiation is associated with a rich variety of ultraviolet-curable resin that is cured when irradiated with ultraviolet radiation, or a rich variety of photopolymerization initiators that can be used, the width of selection for component (A) and component (B) can be widened.

Furthermore, regarding the conditions for the first irradiation with active energy radiation, it is preferable that the peak illuminance at the surface of the coating layer is adjusted to a value within the range of 0.1 to 3 mW/cm$^2$.

The reason for this is that if such a peak illuminance has a value of below 0.1 mW/cm$^2$, a sufficient internal structure-unformed region can be secured; however, it may be difficult to form a clear louver structure. On the other hand, if such a peak illuminance has a value of above 3 mW/cm$^2$, even if an internal structure-unformed region exists, it is speculated that the curing reaction in the relevant region proceeds excessively, and thus, in the step of second irradiation with active energy radiation that will be described below, it may be difficult to satisfactorily form a columnar structure as the second internal structure.

Therefore, it is more preferable that the lower limit of the peak illuminance at the surface of the coating layer in the first irradiation with active energy radiation is adjusted to a value of 0.3 mW/cm$^2$ or greater, and even more preferably to a value of 0.5 mW/cm$^2$ or greater.

Furthermore, it is more preferable that the upper limit of the peak illuminance at the surface of the coating layer in the first irradiation with active energy radiation is adjusted to a value of 2 mW/cm$^2$ or less, and even more preferably to a value of 1.5 mW/cm$^2$ or less.

Furthermore, it is preferable that the cumulative amount of light at the surface of the coating layer in the first irradiation with active energy radiation is adjusted to a value within the range of 5 to 100 mJ/cm$^2$.

The reason for this is that if such a cumulative amount of light has a value of below 5 mJ/cm$^2$, it may be difficult to sufficiently extend the louver structure from the upper part toward the lower part, or the louver structure may change when a columnar structure is formed as the second internal structure. On the other hand, if such a cumulative amount of light has a value of above 100 mJ/cm$^2$, curing may proceed excessively in the internal structure-unformed region, and it may be difficult to satisfactorily form a columnar structure as the second internal structure in the step for second irradiation with active energy radiation that will be described below.

Therefore, it is more preferable that the lower limit of the cumulative amount of light at the surface of the coating layer in the first irradiation with active energy radiation is adjusted to a value of 7 mJ/cm$^2$ or greater, and even more preferably to a value of 10 mJ/cm$^2$ or greater.

Furthermore, it is more preferable that the upper limit of the cumulative amount of light at the surface of the coating layer in the first irradiation with active energy radiation is adjusted to a value of 50 mJ/cm$^2$ or less, and even more preferably to a value of 30 mJ/cm$^2$ or less.

Furthermore, from the viewpoint of stably forming a louver structure while maintaining mass productivity, it is preferable that when the first irradiation with active energy radiation is performed, the coating layer formed on the process sheet is moved at a rate within the range of 0.1 to 10 m/min.

Particularly, it is more preferable that the coating layer is moved at a rate of 0.2 m/min or grater, and it is more preferable that the coating layer is moved at a rate of 3 m/min or less.

From the viewpoint of efficiently leaving an internal structure-unformed region, it is preferable that the step of performing first irradiation with active energy radiation is carried out in an atmosphere containing oxygen (preferably, in an air atmosphere).

The reason for this is that when the first irradiation with active energy radiation is performed in an atmosphere containing oxygen, an internal structure-unformed region can be stably left in the upper part of the coating layer by utilizing the influence of oxygen inhibition, while a louver structure is efficiently formed in the lower part of the coating layer.

That is, it is because if the first irradiation with active energy radiation is performed not in an atmosphere containing oxygen but in an oxygen-free atmosphere containing no oxygen, a louver structure may be formed continuously almost to the outermost surface of the film, without leaving an internal structure-unformed region in the upper part of the film.

The phrase "in an atmosphere containing oxygen" means conditions in which the top face of the coating layer is in direct contact with a gas containing oxygen, such as air, and above all, the phrase "in an air atmosphere" means conditions in which the top face of the coating layer is in direct contact with air.

Therefore, performing the first irradiation with active energy radiation in a state in which the top face of the coating layer is exposed directly to air, without performing particular means such as laminating a film on the top face of the coating layer or purging with nitrogen, corresponds to the first irradiation with active energy radiation "in an air atmosphere".

(7)-4 Step (d): Step of Performing Second Irradiation with Active Energy Radiation Step (d) is, as illustrated in FIG. 6C, a step of further subjecting the coating layer 1 to second irradiation with active energy radiation, and forming a columnar structure 30 as the second internal structure in the internal structure-unformed region 1'.

Figure 6C:
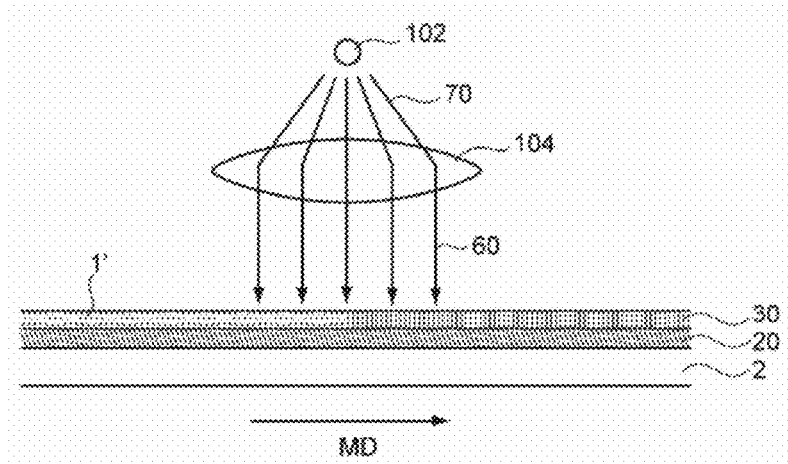

That is, as illustrated in FIG. 6C, the coating layer 1 formed on the process sheet is irradiated with parallel light 60 having a high degree of parallelism of light rays as the emitted light.

Specifically, it is preferable that the degree of parallelism of the emitted light is adjusted to a value of 10° or less.

The reason for this is that when the degree of parallelism of the emitted light is adjusted to a value within such a range, a columnar structure formed by arranging a plurality of pillar-shaped objects to stand close together at a certain angle of inclination with respect to the film thickness direction can be formed efficiently and stably.

Therefore, it is more preferable that the degree of parallelism of parallel light is adjusted to a value of 5° or less, and even more preferably to a value of 2° or less.

Regarding the conditions for the second irradiation with active energy radiation, it is preferable that the peak illuminance at the surface of the coating layer is adjusted to a value within the range of 0.1 to 20 mW/cm$^2$.

The reason for this is that if such a peak illuminance has a value of below 0.1 mW/cm$^2$, it may be difficult to form a clear columnar structure as the second internal structure. On the other hand, it is because if such an illuminance has a value of above 20 mW/cm$^2$, it is speculated that the curing rate becomes too fast, and a columnar structure as the second internal structure may not be formed effectively.

Therefore, it is more preferable that the lower limit of the peak illuminance at the surface of the coating layer in the second irradiation with active energy radiation is adjusted to a value of 0.3 mW/cm$^2$ or greater, and even more preferably to a value of 0.5 mW/cm$^2$ or greater.

Furthermore, it is more preferable that the upper limit of the peak illuminance at the surface of the coating layer in the second irradiation with active energy radiation is adjusted to a value of 10 mW/cm$^2$ or less, and even more preferably to a value of 5 mW/cm$^2$ or less.

Furthermore, it is preferable that the cumulative amount of light at the surface of the coating layer in the second irradiation with active energy radiation is adjusted to a value within the range of 5 to 300 mJ/cm$^2$.

The reason for this is that if such a cumulative amount of light has a value of below 5 mJ/cm$^2$, it may be difficult to sufficiently extend the columnar structure as the second internal structure from the upper part toward the lower part. On the other hand, if such a cumulative amount of light has a value of above 300 mJ/cm$^2$, the film thus obtainable may be colored.

Therefore, it is more preferable that the lower limit of the cumulative amount of light at the surface of the coating layer in the second irradiation with active energy radiation is adjusted to a value of 10 mJ/cm$^2$ or greater, and even more preferably to a value of 20 mJ/cm$^2$ or greater.

Furthermore, it is more preferable that the upper limit of the cumulative amount of light at the surface of the coating layer in the second irradiation with active energy radiation is adjusted to a value of 200 mJ/cm$^2$ or less, and even more preferably to a value of 150 mJ/cm$^2$ or less.

Furthermore, it is preferable that the second irradiation with active energy radiation is performed in a oxygen-free atmosphere.

The reason for this is that when the second irradiation with active energy radiation in an oxygen-free atmosphere, a columnar structure as the second internal structure can be formed efficiently by suppressing the influence of oxygen inhibition on the internal structure-unformed region obtained by the first irradiation with active energy radiation.

That is, it is because if the second irradiation with active energy radiation is performed not in an oxygen-free atmosphere but in an oxygen atmosphere, when irradiation is performed at a high illuminance, a columnar structure as the second internal structure may be formed at a very shallow position in the vicinity of the surface; however, the difference in the refractive index required for light diffusion may not be obtained. Furthermore, it is because when irradiation is performed at a low illuminance, a columnar structure as the second internal structure may not be formed in the internal structure-unformed region under the influence of oxygen inhibition.

Meanwhile, the phrase "in an oxygen-free atmosphere" means conditions in which the top face of the coating layer is not in direct contact with an oxygen atmosphere, or an atmosphere containing oxygen.

Therefore, for example, performing the second irradiation with active energy radiation in a state in which a film is laminated on the top face of the coating layer or nitrogen purge has been performed by replacing air with nitrogen gas, corresponds to the second irradiation with active energy radiation "in an oxygen-free atmosphere".

As described above, when a louver structure as the first internal structure and a columnar structure as the second internal structure are formed by the first irradiation with active energy radiation and the second irradiation with active energy radiation, respectively, the combination of angles of inclination in the regions having a relatively high refractive index in the respective internal structures can be easily regulated.

That is, the combination of the angles of inclination in the regions having a relatively high refractive index in the various internal structures can be easily regulated only by appropriately regulating the angles of irradiation in the respective cases of irradiation with active energy radiation.

2. Light Diffusion Control Plate

The light diffusion control plate according to the invention is formed by laminating a plurality of sheets of the predetermined light diffusion control film described above.

The reason for this is that when the predetermined light diffusion control film described above is used, despite that the number of laminated sheets is small such as 3 to 4 sheets, the range of the light diffusion characteristics can be extended effectively, and even in the case of being applied to a large-sized screen, a wide viewing angle can be obtained.

That is, as illustrated in FIG. 3, it is because when sheets of the predetermined light diffusion control film are laminated in a predetermined mode, the diffused light that has been diffused by a certain internal structure being diffused in the next internal structure is repeated, and as a result, light diffusion characteristics suitable as a projection screen can be obtained.

Furthermore, lamination of sheets of the light diffusion control film may be carried out by any lamination method such as lamination by means of a pressure-sensitive adhesive, lamination by means of an adhesive, or lamination based on autohesion properties without using any adhesive; however, adhesion by means of a pressure-sensitive adhesive is particularly preferable.

Examples of a pressure-sensitive adhesive that is suitably used include acrylic, urethane-based, rubber-based, epoxy-based, silicone-based, and polyester-based pressure-sensitive adhesives. The thickness of the pressure-sensitive adhesive layer is preferably adjusted to a value within the range of 2 to 200 µm, and more preferably to a value within the range of 5 to 50 µm.

Furthermore, it is preferable that a plurality of sheets of the light diffusion control film that constitutes the light diffusion control plate are laminated such that, as illustrated in FIG. 3, incident light coming from a projector enters each of the sheets of the light diffusion control film through the columnar structure side as the second internal structure.

The reason for this is that when the light diffusion control plate is configured as such, the incident light coming from a projector can be diffused more uniformly.

That is, it is because when light is perpendicularly incident through the columnar structure side, a wide diffusion region can be efficiently obtained, whereas when light enters through the louver structure side, since linear anisotropic diffusion occurs first, and then only the light of the portion overlapping with the diffusion region of the columnar structure is isotropically diffused into a circular shape, it may be difficult to stably extend the range of the light diffusion characteristics.

Furthermore, as illustrated in FIG. 3, it is preferable that a plurality of sheets of the light diffusion control film are composed of first to third light diffusion control films having the same configuration, and the first to third light diffusion control films are laminated such that the directions of exit (PD) for the light diffusion control films are respectively different directions.

The reason for this is that when the light diffusion control films are configured as such, as explained in section "Light diffusion control film" using FIG. 3, incident light coming from a wide angle can be diffused more effectively in various directions within the projection screen plane.

Furthermore, as illustrated in FIG. 3, it is preferable that when a projection screen is installed to be parallel to the vertical direction, a first light diffusion control film having the direction of exit (PD) facing downward, a second light diffusion control film having the direction of exit (PD) facing a lateral side, and a third light diffusion control film having the direction of exit (PD) in a direction reverse to that of the second light diffusion control film, are laminated in order from the side where incident light coming from a projector enters the projection screen.

The reason for this is that when the light diffusion control films are configured as such, as explained in section "Light diffusion control film" using FIG. 3, incident light coming from a wide angle can be more effectively diffused in the downward direction and the horizontal direction of the projection screen.

Meanwhile, in a projection screen, regarding the horizontal direction, usually, there is a need to effectively diffuse incident light coming from a wide angle in both the leftward direction and the rightward direction. However, regarding the vertical direction, as long as incident light coming from a wide angle in any one direction between the upward direction and the downward direction can be effectively diffused into, the projection screen can be sufficiently utilized for practical use.

That is, for example, in a case in which a projection screen is used as a horizontally long rectangular-shaped digital sign that is installed at the rooftop of a building, the projection screen is installed in a direction which incident light coming from both the horizontal direction and the upward direction can be effectively diffused.

Then, a projector that serves as a light source is installed at a position that is the center in the horizontal direction of the projection screen and upper to the center in the vertical direction, and thereby the projection screen can be viewed from the front face, the right and left sides, and the lower side.

In contrast, if it is attempted to diffuse even incident light coming from an unnecessary angle, the brightness of the displayed image tends to be easily decreased.

However, when more sheets of the light diffusion control film are further laminated, it is also possible to diffuse incident light coming from all angles.

Furthermore, it is preferable that a light diffusion control film having only a columnar structure as an internal structure is further laminated as a fourth light diffusion control film on a surface of the third light diffusion control film, the surface being on the opposite side of the side where the second light diffusion control film is laminated.

The reason for this is that when the laminate is configured as such, incident light coming from a wide angle can be diffused more uniformly.

Furthermore, it is preferable that the thickness of the light diffusion control plate is adjusted to a value within the range of 186 to 3,600 µm.

The reason for this is that if the thickness of the light diffusion control plate has a value of below 186 µm, the film thickness of the light diffusion control films used becomes excessively thin, and when the light diffusion control plate is used as a projection screen, uniformly diffused light may not be obtained. On the other hand, it is because if the thickness of the light diffusion control plate has a value of above 3,600 μm, the image may be blurred without being in focus, or the luminance may be decreased.

Therefore, it is more preferable that the lower limit of the thickness of the light diffusion control plate is adjusted to a value of 255 μm or greater, and even more preferably to a value of 315 μm or greater.

Also, it is more preferable that the upper limit of the thickness of the light diffusion control plate is adjusted to a value of 2,000 μm or less, and even more preferably to a value of 1,200 μm or less.

3. Other Laminates

When a projection screen is configured, from the viewpoint of supporting the light diffusion control plate and enhancing handleability, it is preferable that a base material film is laminated on the incident side of the light diffusion control plate.

Regarding such a base material film, it is preferable to use, for example, a film of a polycarbonate, a polyallylate, polyether sulfone, an amorphous polyolefin, polyethylene terephthalate, or polymethyl methacrylate.

It is preferable that the thickness of the base material film is adjusted to a value within the range of, usually, 0.5 to 10 mm, and more preferably to a value within the range of 2 to 8 mm.

Furthermore, lamination of the base material film on the light diffusion control plate may be carried out by any lamination method such as lamination by means of a pressure-sensitive adhesive, lamination by means of an adhesive, or lamination based on autohesion properties without using any adhesive; however, lamination by means of a pressure-sensitive adhesive is particularly preferable.

In addition to that, from the viewpoint of preventing reflection of external light to the viewer's side, an antireflection film may be laminated on the viewer's side of the light diffusion control film, or a pressure-sensitive adhesive layer for fixing the projection screen to an adherend such as a window may also be laminated.

In the case of configuring the projection screen of the invention as a rear projection screen, it is acceptable if the projection screen comprises at least a light diffusion control plate, and if necessary, the base material film, antireflection film, or pressure-sensitive adhesive layer described above, or the like may be laminated thereon as appropriate.

Meanwhile, in the case of configuring the projection screen of the invention as a front projection screen, it is acceptable if the projection screen comprises at least a light diffusion control plate and a reflector plate, and if necessary, the base material film, antireflection film, or pressure-sensitive adhesive layer described above, or the like may be laminated thereon as appropriate.

EXAMPLES

Hereinafter, the invention will be described in more detail by way of Examples.

Example 1

1. Synthesis of Component (B): Low-Refractive Index Polymerizable Compound 2 mol of isophorone diisocyanate (IPDI) and 2 mol of 2-hydroxyethyl methacrylate (HEMA) with respect to 1 mol of polypropylene glycol (PPG) having a weight average molecular weight of 9,200 were introduced into a vessel, and then the mixture was allowed to react according to a routine method. Thus, a polyether urethane methacrylate having a weight average molecular weight of 9,900 was obtained.

The weight average molecular weights of polypropylene glycol and polyether urethane methacrylate are values measured by gel permeation chromatography (GPC) under the following conditions and calculated relative to polystyrene standards.

GPC analyzer: manufactured by Tosoh Corp., HLC-8020
GPC column: manufactured by Tosoh Corp. (described below in the order of passage)
TSK guard column HXL-H
TSK gel GMHXL (×2)
TSK gel G2000HXL
Measurement solvent: tetrahydrofuran
Measurement temperature: 40° C.

2. Preparation of Composition for Light Diffusion Control Film

Next, 150 parts by weight of o-phenylphenoxyethoxyethyl acrylate represented by Formula (3) described above and having a molecular weight of 268 (manufactured by Shin Nakamura Chemical Co., Ltd., NK ESTER A-LEN-10) as component (A), 20 parts by weight of 2-hydroxy-2-methylpropiophenone (8 parts by weight with respect to the total amount (100 parts by weight) of component (A) and component (B)) as component (C) were added to 100 parts by weight of polyether urethane methacrylate having a weight average molecular weight of 9,900 as component (B) thus obtained. Subsequently, the mixture was heated and mixed under the conditions of 80° C., and thus a composition for a light diffusion control film was obtained.

The refractive indices of component (A) and component (B) were measured according to JIS K0062 using an Abbe refractometer (manufactured by Atago Co., Ltd., Abbe refractometer DR-M2, Na light source, wavelength 589 nm), and the refractive indices were 1.58 and 1.46, respectively.

3. Coating Step

Next, the composition for a light diffusion control film thus obtained was applied on a transparent film-like polyethylene terephthalate as a process sheet that has been subjected to a release treatment, and thus a coating layer having a film thickness of 200 μm was formed.

4. First Irradiation with Active Energy Radiation

Next, as illustrated in FIG. 6B, the coating layer 1 was irradiated, using a linear light source, with light that was substantially parallel light when viewed from the axial direction of the linear light source and was non-parallel random light when viewed from another direction, such that the angle of irradiation θx illustrated in FIG. 7 was almost 15°.

The peak illuminance at that time was 1.12 mW/cm$^2$, the cumulative amount of light was 22.8 mJ/cm$^2$, the lamp height was 500 mm, and the travel speed of the coating layer was 0.2 m/min.

5. Second Irradiation with Ultraviolet Radiation

Next, after the step of performing first irradiation with ultraviolet radiation, the exposed surface side of the coating layer was brought into a state in an oxygen-free atmosphere by laminating an ultraviolet-transmitting release film having a thickness of 38 μm (manufactured by Lintec Corp., SP-PET382050) on the exposed surface side.

Next, as illustrated in FIG. 6C, the coating layer was irradiated with parallel light having a degree of parallelism of 2° or less using an ultraviolet parallel light spot source (manufactured by Jatec Co., Ltd.), for which the degree of parallelism of central light rays was controlled within ±3°, through the same side as that used in the step for the first irradiation with ultraviolet radiation such that the angle of irradiation θx illustrated in FIG. 7 was almost 0°. Thus, a light diffusion control film having a louver-columnar structure and having a total film thickness of 200 μm was obtained.

The peak illuminance at that time was 1.18 mW/cm², the cumulative amount of light was 24.1 mJ/cm², the lamp height was 240 mm, and the travel speed of the coating layer was 0.2 m/min.

The peak illuminance and the cumulative amount of light were measured by installing a UV meter (manufactured by Eye Graphics Co., Ltd., EYE cumulative UV irradiation intensity tester UVPF-A1) equipped with a photodetector at the position of the coating layer.

The film thickness of the light diffusion control film was measured using a constant pressure thickness measuring device (manufactured by Takara Co., Ltd., TECLOCK PG-02J).

Figure 8A:
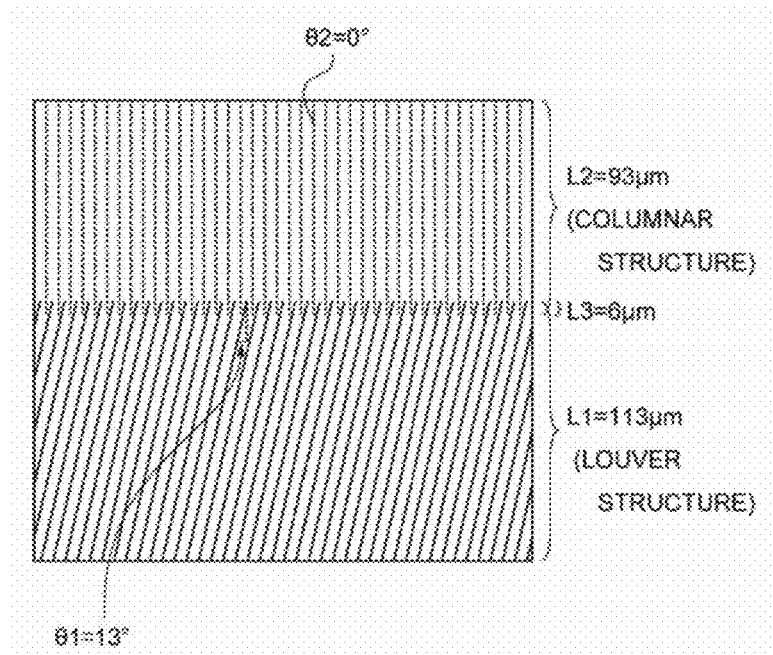
FIGS. 8A and 8B are diagrams provided to explain a schematic cross-sectional view and a photograph of the light diffusion control film used in Example 1, the film having a louver-columnar structure.
Figure 8B:
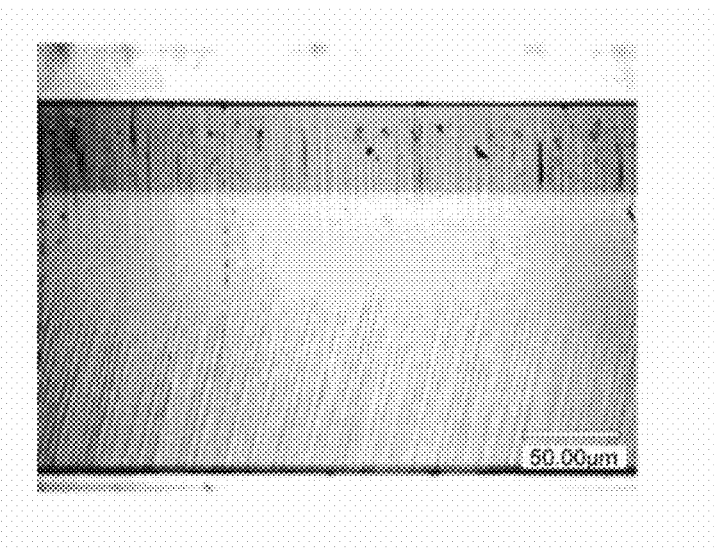

A schematic diagram of a cross-section produced by cutting the light diffusion control film having a louver-columnar structure thus obtained, at a plane that was parallel to the traveling direction of the coating layer and was orthogonally intersecting the film plane, is presented in FIG. 8A, and a photograph of the cross-section is presented in FIG. 8B.

As illustrated in FIG. 8A, the length L1 of the louver structure was 113 μm, and the angle of inclination θ1 was 13°.

The length L2 of the columnar structure was 93 μm, and the angle of inclination θ2 was 0°.

Furthermore, there was an overlapping internal structure formed as an edge of the pillar-shaped objects originating from the columnar structure was in contact with the vicinity of an edge of the plate-shaped objects originating from the louver structure, and the length L3 of the overlapping internal structure was 6 μm.

The value of θ1-θ2 in the overlapping internal structure was 13°.

Cutting of the light diffusion control film was performed using a razor blade, and capturing of photographs of the cross-section was performed by reflective observation using a digital microscope (manufactured by Keyence Corp., VHX-2000).

In the schematic diagram of FIG. 8A, the plate-shaped regions having a relatively high refractive index in the louver structure are indicated with solid lines, while the pillar-shaped objects in the columnar structure are indicated with dotted lines (hereinafter, the same).

6. Light Diffusion Characteristics of Light Diffusion Control Film Having Louver-Columnar Structure The light diffusion characteristics of the light diffusion control film having a louver-columnar structure thus obtained were evaluated.

That is, a pressure-sensitive adhesive layer was provided on the release film surface of the light diffusion control film having a louver-columnar structure, which was obtained in a state of being sandwiched between a process sheet and a release film, and the light diffusion control film was adhered to a soda glass plate having a thickness of 1.1 mm. This was used as a specimen for evaluation.

Figure 9A:
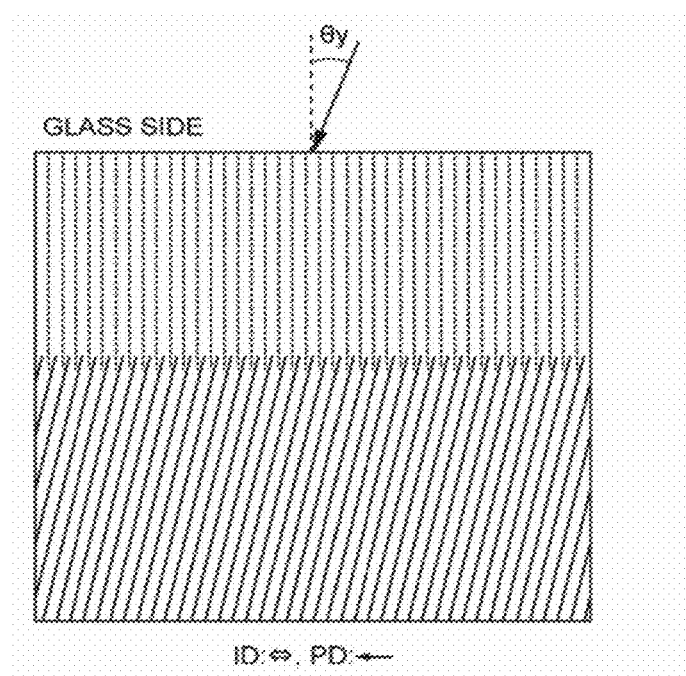
FIGS. 9A and 9B are diagrams provided to explain the light diffusion characteristics of the light diffusion control film used in Example 1, the film having a louver-columnar structure.
Figure 9B:
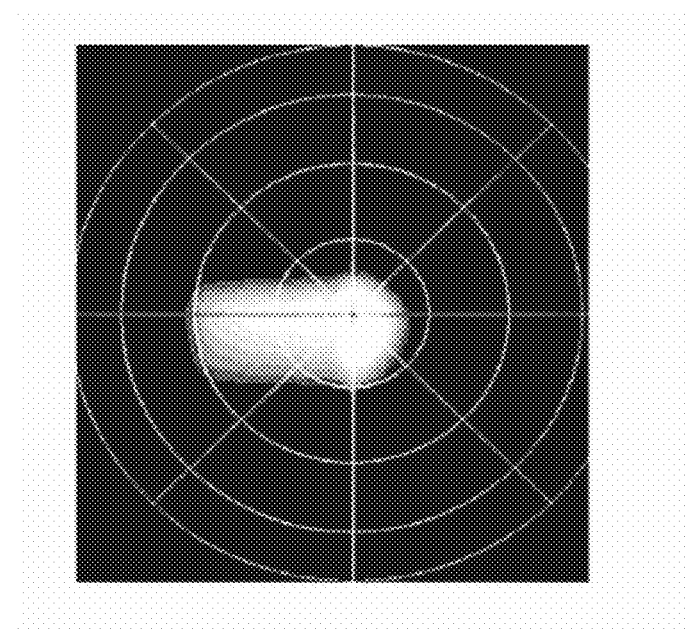

Next, as illustrated in FIG. 9A, light was caused to enter through the glass side of the specimen, that is, through the columnar structure side, at an angle of incidence θy of 0° with respect to the film plane, using a conoscope (manufactured by autronic-MELCHERS GmbH). A conoscopic image thus obtained is presented in FIG. 9B.

7. Production of Rear Projection Screen

Next, a plurality of sheets of the light diffusion control film thus obtained were laminated to obtain a light diffusion control plate, and a base material film was laminated on the light diffusion control plate thus obtained. Thus, a rear projection screen was obtained.

Figure 10A:
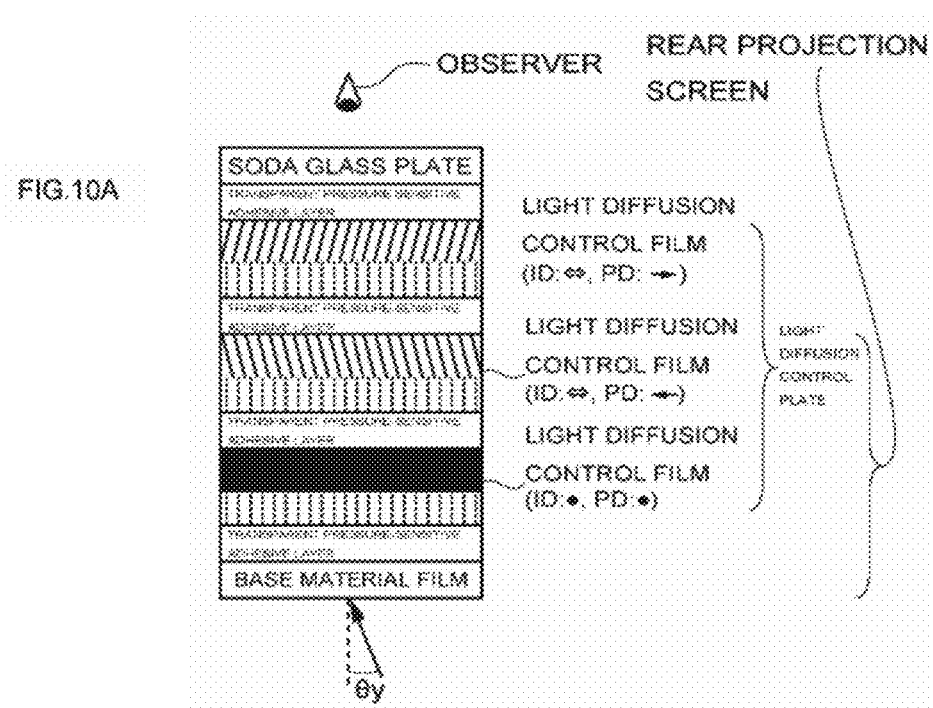
FIGS. 10A and 10B are diagrams provided to explain the configuration and the light diffusion characteristics of the rear projection screen of Example 1.

That is, as illustrated in FIG. 10A, the light diffusion control film having a louver-columnar structure as illustrated in FIGS. 8A and 8B (ID: ⇔, PD: →), the same light diffusion control film (ID: ⇔, PD: ←), and the same light diffusion control film (ID: ●, PD: ●) were laminated in order from the side of the soda glass plate having a thickness of 1.1 mm. Thus, a laminate of soda glass plate/transparent pressure-sensitive adhesive layer/light diffusion control plate (laminate of light diffusion control films)/transparent pressure-sensitive adhesive layer/base material film (=laminate of soda glass plate/transparent pressure-sensitive adhesive layer/rear projection screen) was obtained.

A polyethylene terephthalate film having a thickness of 100 μm was used as the base material film.

The soda glass plate was considered as a constituent element of the laminate under the assumption of an adherend of the rear projection screen.

8. Light Diffusion Characteristics of Rear Projection Screen

For the specimen thus obtained, the light diffusion characteristics in the case of varying the angle of incidence were evaluated.

That is, the laminate of soda glass plate/transparent pressure-sensitive adhesive layer/rear projection screen thus obtained was directly used as a specimen for evaluation.

Next, as illustrated in FIG. 10A, light was caused to enter the specimen through the lower side of the specimen, that is, through the base material film side, while varying the angle of incidence θy in the horizontal direction on the paper plane to −30°, −20°, −10°, 0°, 10°, 20°, and 30°, using a conoscope (manufactured by autronic-MELCHERS GmbH).

Similarly, light was caused to enter the specimen while varying the angle of incidence θ'y in a direction perpendicular to the paper plane to −30°, −20°, −10°, 0°, 10°, 20°, and 30°.

Figure 10B:
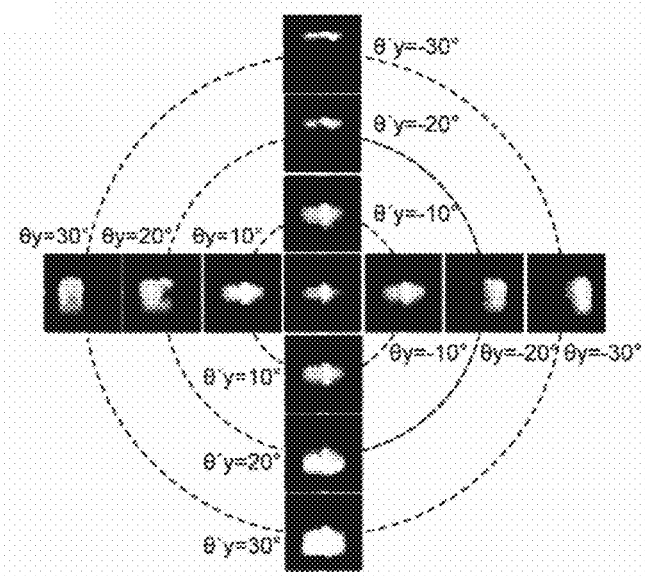

A conoscopic image obtained when the specimen was viewed from above, as illustrated in FIG. 10A, is presented in FIG. 10B.

Example 2

Figure 12A:
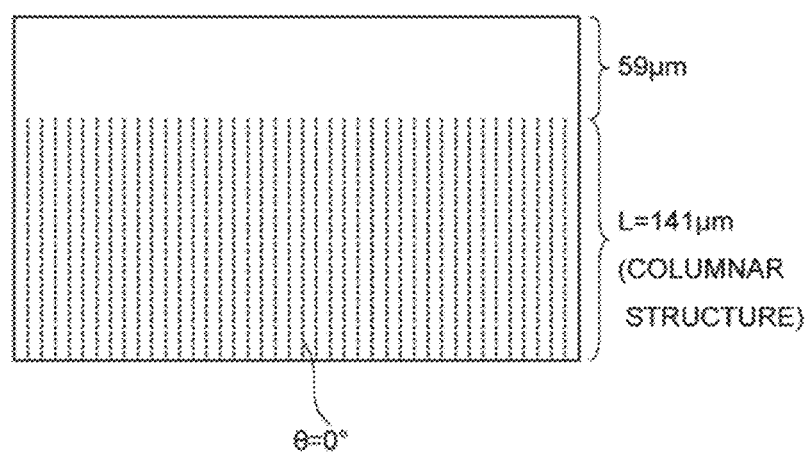
FIGS. 12A and 12B are diagrams provided to explain a schematic cross-sectional view and a photograph of the light diffusion control film used in Example 2, the film having a columnar structure only.
Figure 12B:
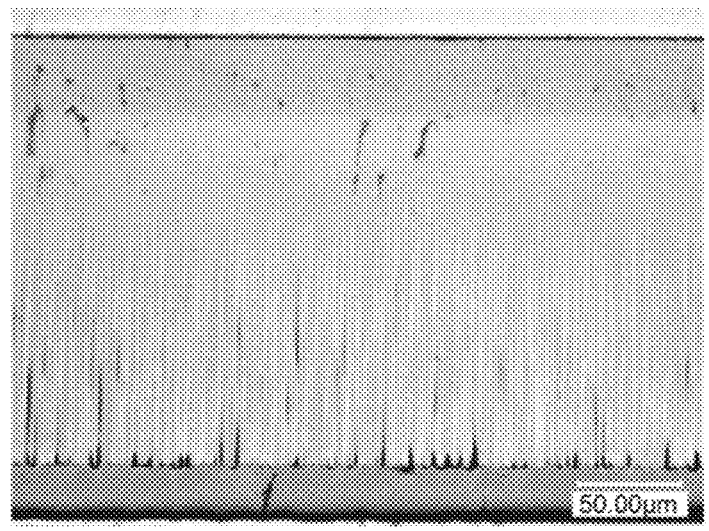

In Example 2, a rear projection screen was produced in the same manner as in Example 1, except that a laminate formed by laminating a light diffusion control film having only a columnar structure as illustrated in FIGS. 12A and 12B (ID: none, PD: none), a light diffusion control film having a louver-columnar structure as illustrated in FIGS. 8A and 8B (ID: ⇔, PD: →), the same light diffusion control film (ID: ⇔, PD: ←), and the same light diffusion control film (ID: ●, PD: ●) in order from the side of the soda glass plate, as illustrated in FIG. 11A, was used as a light diffusion control plate, and the resulting rear projection screen was evaluated. The results thus obtained are presented in FIG. 11B.

Meanwhile, the light diffusion control film having only a columnar structure as illustrated in FIGS. 12A and 12B was produced in the same manner as in Example 1, except that when the light diffusion control film was produced, the first irradiation with ultraviolet radiation was not performed, the second irradiation with ultraviolet radiation was performed in a state in which a release film was not laminated, by changing the angle of irradiation to 0°, the peak illuminance to 1.24 mW/cm², and the cumulative amount of light to 29.6 mJ/cm², and then the light diffusion control film was completely cured by irradiating the film with scattered light having a random angle of irradiation in a state of having the release film laminated thereon.

Example 3

Figure 13A:
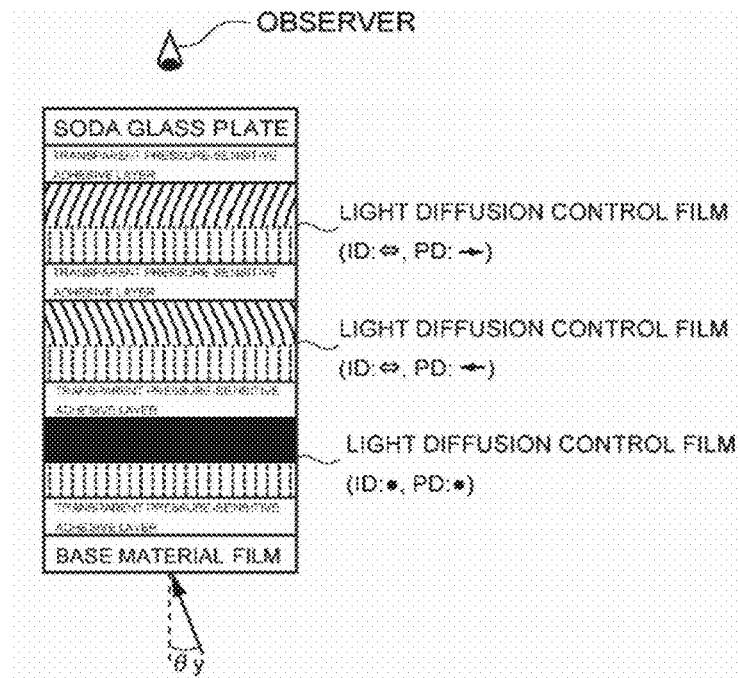
FIGS. 13A and 13B are diagrams provided to explain the configuration and the light diffusion characteristics of the rear projection screen of Example 3.
Figure 13B:
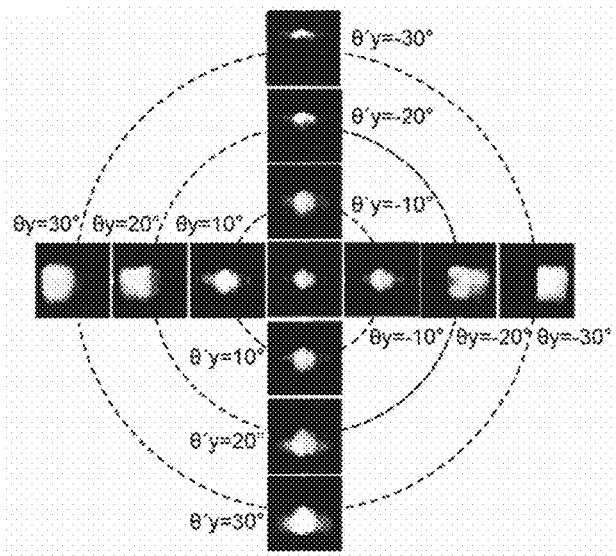

In Example 3, a rear projection screen was produced in the same manner as in Example 1, except that a laminate formed by laminating a light diffusion control film having a bent louver-columnar structure as illustrated in FIG. 14 (ID: ⇔, PD: →), the same light diffusion control film (ID: ⇔, PD: ←), a light diffusion control film having a louver-columnar structure as illustrated in FIGS. 8A and 8B (ID: ●, PD: ●) in order from the side of the soda glass plate, as illustrated in FIG. 13A, was used as a light diffusion control plate, and the resulting rear projection screen was evaluated. The results thus obtained are presented in FIG. 13B.

The light diffusion control film having a bent louver-columnar structure as illustrated in FIG. 14 was produced in the same manner as in Example 1, except that when the composition for a light diffusion control film was prepared, 0.5 parts by weight of a benzotriazole-based ultraviolet absorber (manufactured by BASF SE, TINUVIN 384-2) as component (D) (0.2 parts by weight with respect to the total amount (100 parts by weight) of component (A) and component (B)) was further added to the composition.

Example 4

Figure 15A:
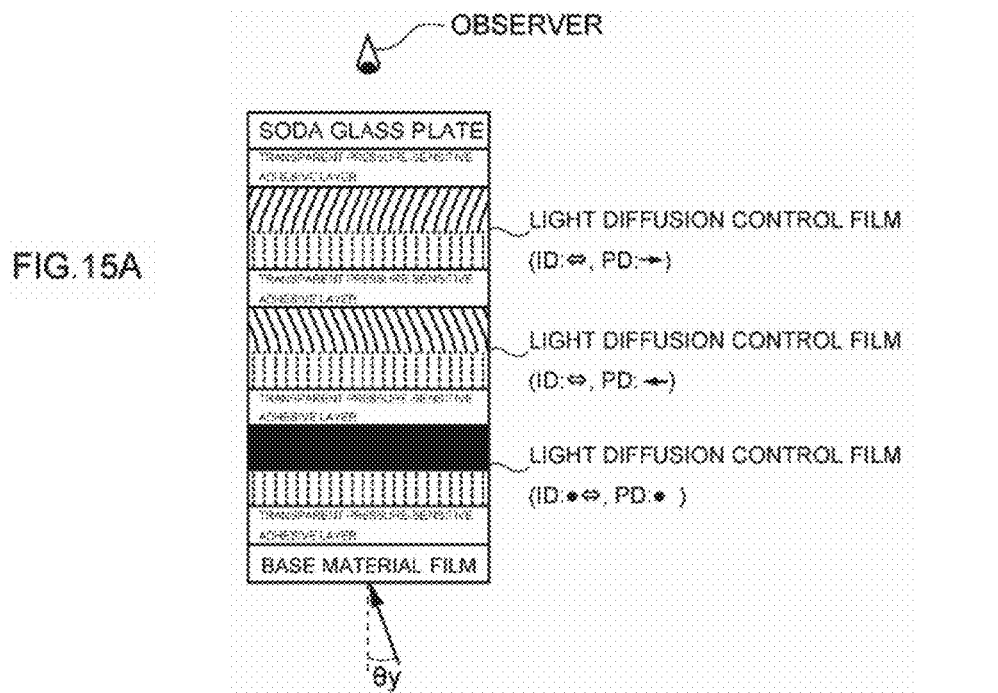
FIGS. 15A and 15B are diagrams provided to explain the configuration and the light diffusion characteristics of the rear projection screen of Example 4.
Figure 15B:
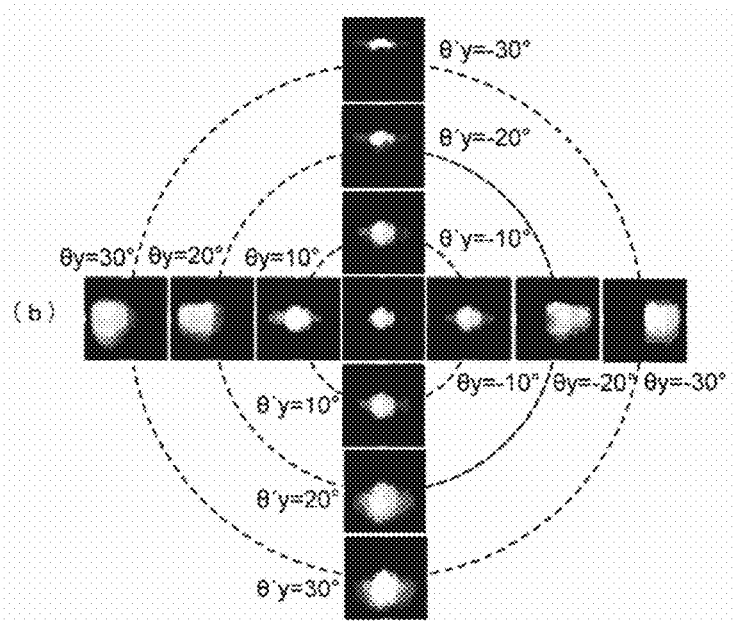

In Example 4, a rear projection screen was produced in the same manner as in Example 1, except that a laminate formed by laminating a light diffusion control film having a bent louver-columnar structure as illustrated in FIG. 14 (ID: ⇔, PD: →), the same light diffusion control film (ID: ⇔, PD: ←), and the same light diffusion control film (ID: ●, PD: ●) in order from the side of the soda glass plate, as illustrated in FIG. 15A, was used as a light diffusion control plate, and the resulting rear projection screen was evaluated. The results thus obtained are presented in FIG. 15B.

Example 5

In Example 5, a rear projection screen was produced in the same manner as in Example 1, except that a laminate formed by laminating a light diffusion control film having only a columnar structure as illustrated in FIGS. 12A and 12B (ID: none, PD: none), a light diffusion control film having a bent louver-columnar structure as illustrated in FIG. 14 (ID: ⇔, PD: →), the same light diffusion control film (ID: ⇔, PD: ←), and the same light diffusion control film (ID: ●, PD: ●) in order from the side of the soda glass plate, as illustrated in FIG. 16A, was used as a light diffusion control plate, and the resulting rear projection screen was evaluated. The results thus obtained are presented in FIG. 16B.

Example 6

Figure 17A:
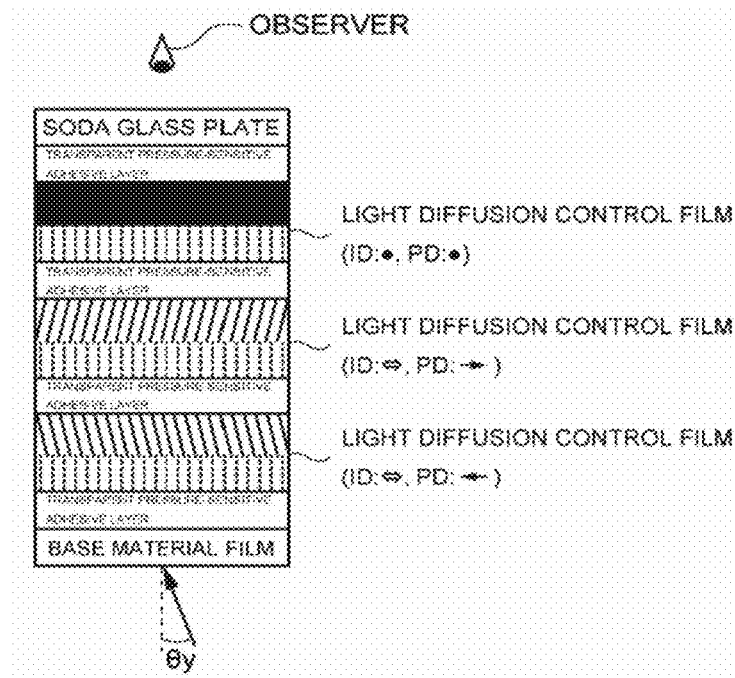
FIGS. 17A and 17B are diagrams provided to explain the configuration and the light diffusion characteristics of the rear projection screen of Example 6.
Figure 17B:
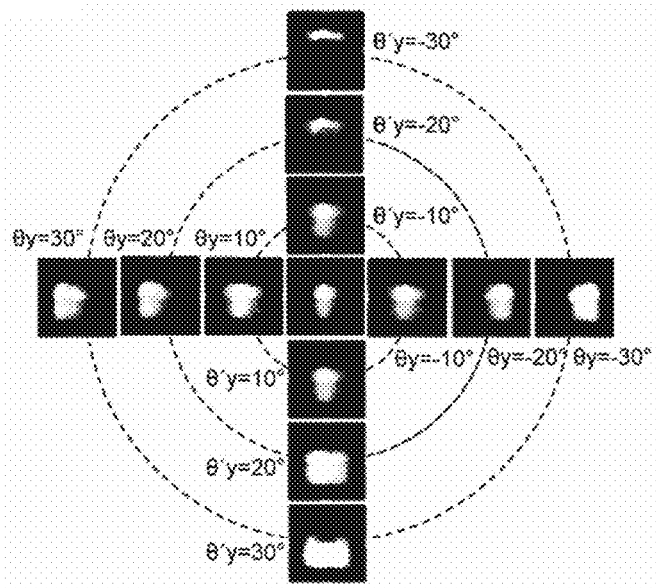

In Example 6, a rear projection screen was produced in the same manner as in Example 1, except that a laminate formed by laminating a light diffusion control film having a louver-columnar structure as illustrated in FIGS. 8A and 8B (ID: ●, PD: ●), the same light diffusion control film (ID: ⇔, PD: →), and the same light diffusion control film (ID: ⇔, PD: ←) in order from the side of the soda glass plate, as illustrated in FIG. 17A, was used as a light diffusion control plate, and the resulting rear projection screen was evaluated. The results thus obtained are presented in FIG. 17B.

Example 7

Figure 18A:
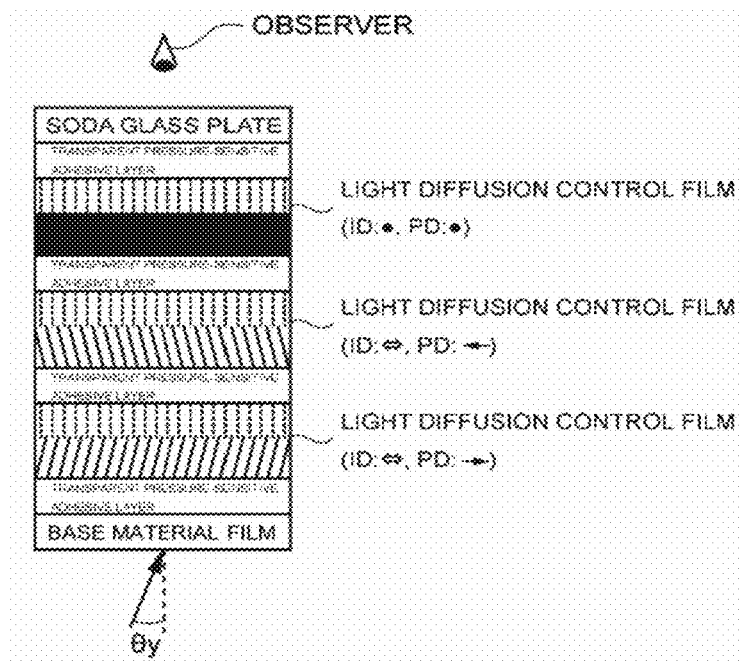
FIGS. 18A and 18B are diagrams provided to explain the configuration and the light diffusion characteristics of the rear projection screen of Example 7.
Figure 18B:
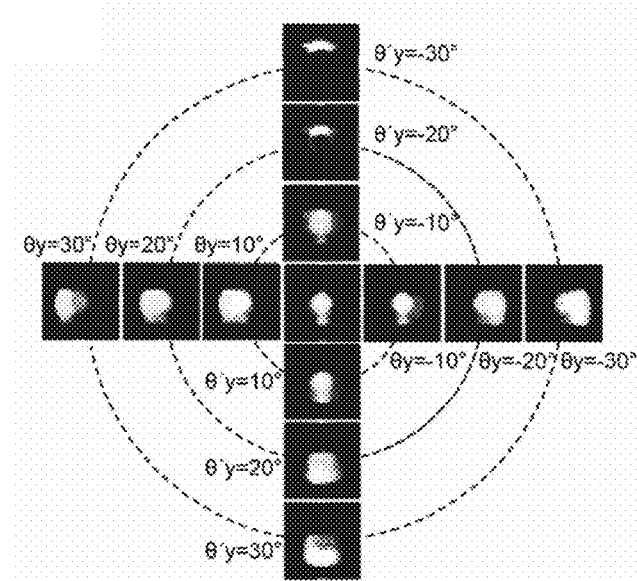

In Example 7, a rear projection screen was produced in the same manner as in Example 1, except that a light diffusion control film having a louver-columnar structure as illustrated in FIGS. 8A and 8B (ID: ●, PD: ●), the same light diffusion control film (ID: ⇔, PD: ←), and the same light diffusion control film (ID: ⇔, PD: →) in order from the side of the soda glass plate, as illustrated in FIG. 18A, was used as a light diffusion control plate, and the resulting rear projection screen was evaluated. The results thus obtained are presented in FIG. 18B.

Comparative Example 1

Figure 19A:
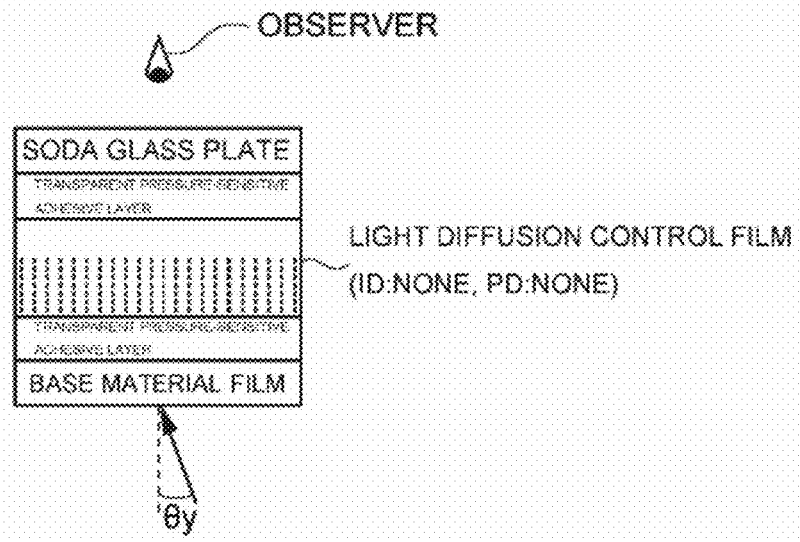
FIGS. 19A and 19B are diagrams provided to explain the configuration and the light diffusion characteristics of the rear projection screen of Comparative Example 1.
Figure 19B:
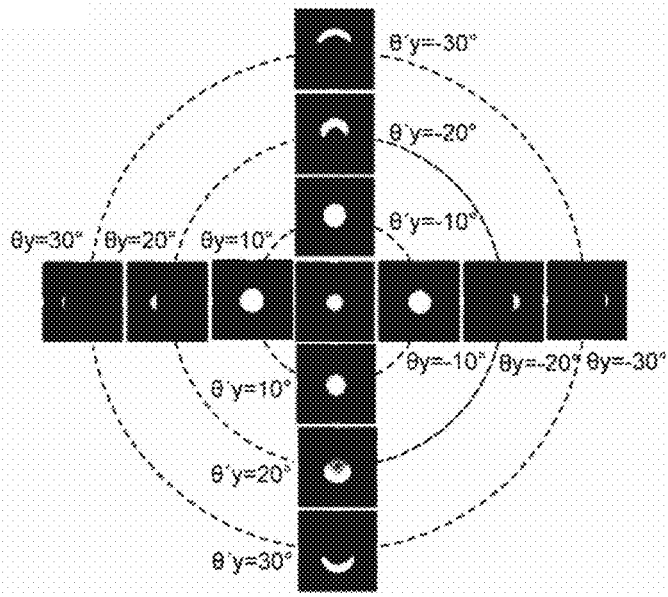

In Comparative Example 1, a rear projection screen was produced in the same manner as in Example 1, except that a light diffusion control film having only a columnar structure as illustrated in FIGS. 12A and 12B (ID: none, PD: none) was used alone as the light diffusion control plate as illustrated in FIG. 19A, and the resulting the rear projection screen was evaluated. The results thus obtained are presented in FIG. 19B.

Comparative Example 2

Figure 20A:
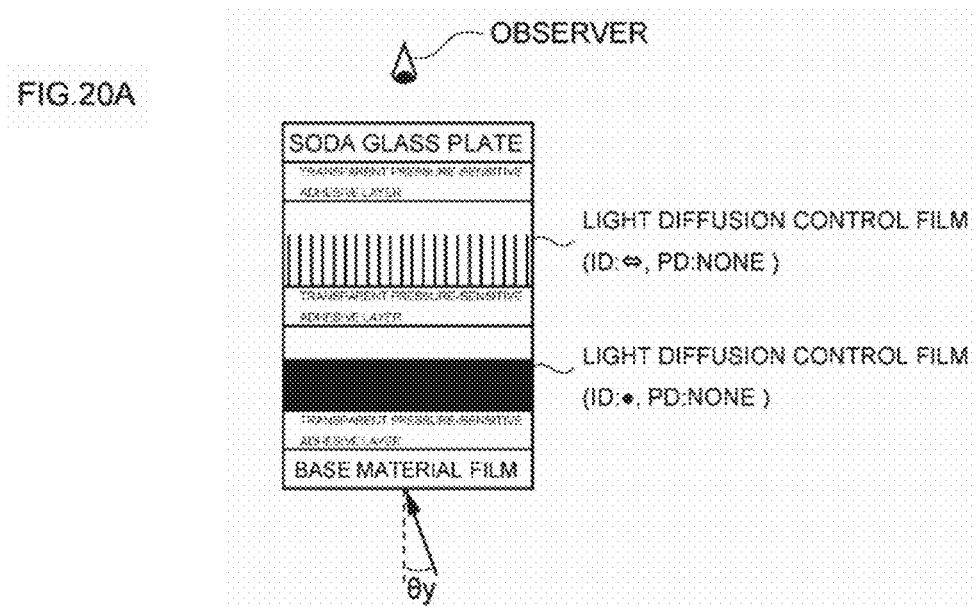
FIGS. 20A and 20B are diagrams provided to explain the configuration and the light diffusion characteristics of the rear projection screen of Comparative Example 2.
Figure 20B:
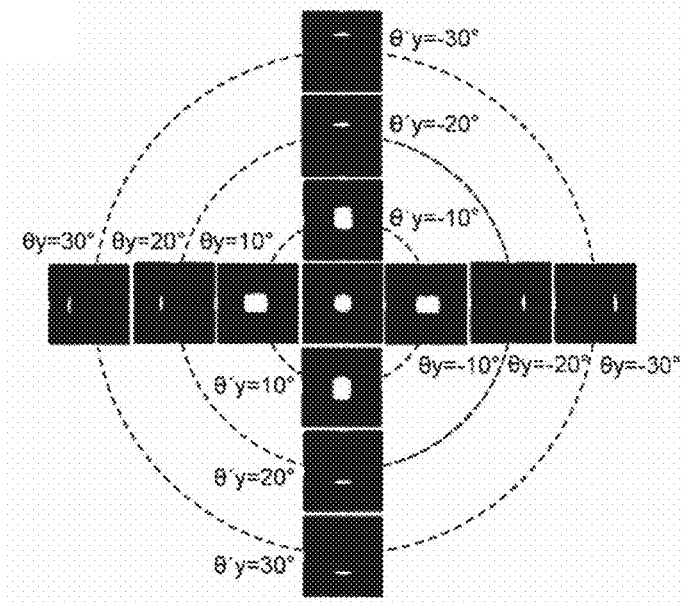
Figure 21A:
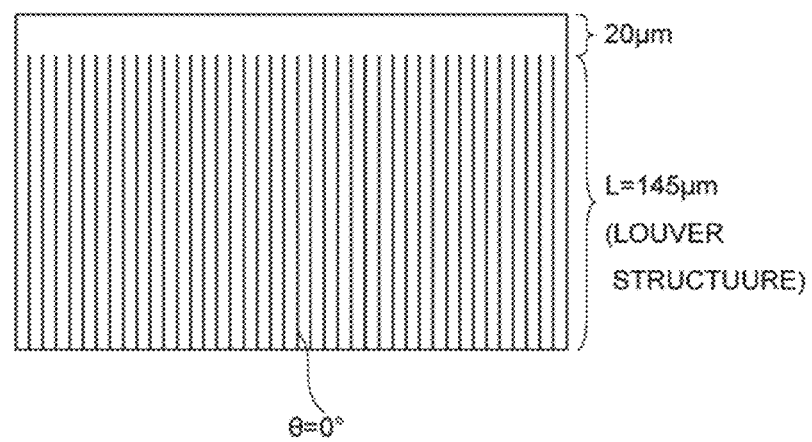
FIGS. 21A and 21B are diagrams provided to explain a schematic cross-sectional view and a photograph of the light diffusion control film used in Comparative Example 2, the film having a louver structure only.
Figure 21B:
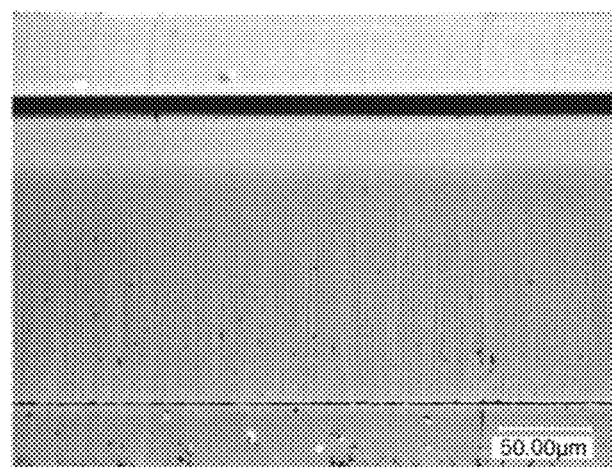

In Comparative Example 2, a rear projection screen was produced in the same manner as in Example 1, except that a laminate formed by laminating a light diffusion control film having only a louver structure as illustrated in FIGS. 21A and 21B (ID: ⇔, PD: none) and the same light diffusion control film (ID: ●, PD: none) in order from the side of the soda glass plate, as illustrated in FIG. 20A, was used as a light diffusion control plate, and the resulting rear projection screen was evaluated. The results thus obtained are presented in FIG. 20B.

The light diffusion control film having only a louver structure as illustrated in FIGS. 21A and 21B was produced in the same manner as in Example 1, except that when the light diffusion control film was produced, the film thickness of the coating layer was adjusted to 165 μm, the first irradiation with ultraviolet radiation was performed under the conditions of an angle of irradiation of 0°, a peak illuminance of 2.55 mW/cm², and a cumulative amount of light of 39.2 mJ/cm², the second irradiation with ultraviolet radiation was not performed, and instead, the light diffusion control film was completely cured by irradiating the film with scattered light having a random angle of irradiation in a state of having a release film laminated thereon.

Comparative Example 3

Figure 22A:
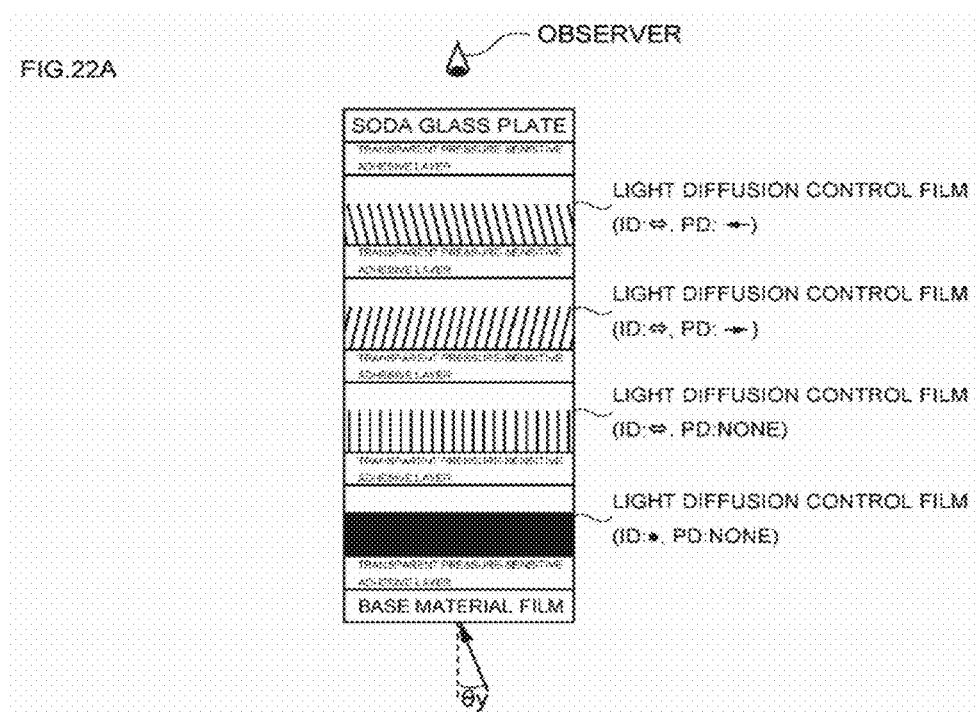
FIGS. 22A and 22B are diagrams provided to explain the configuration and the light diffusion characteristics of the rear projection screen of Comparative Example 3.
Figure 22B:
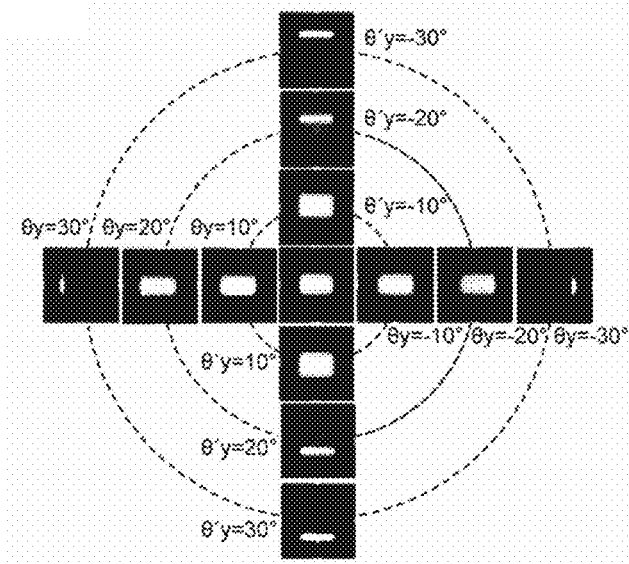
Figure 23A:
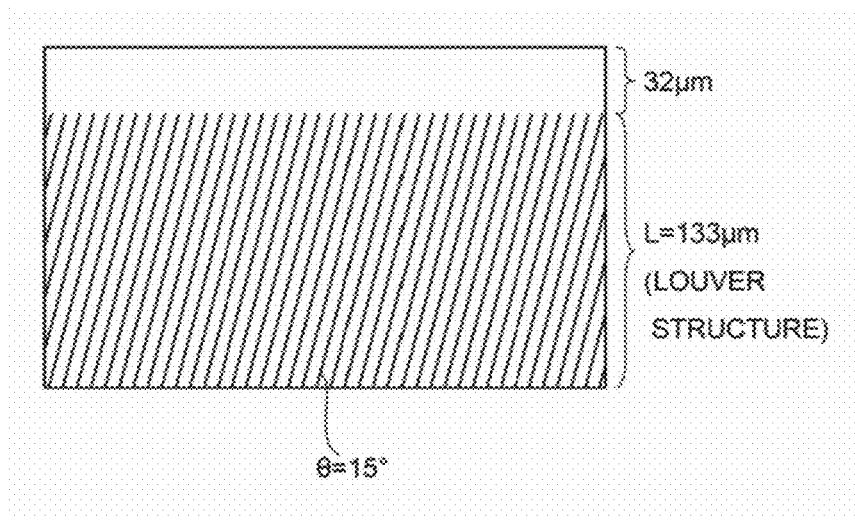
FIGS. 23A and 23B are diagrams provided to explain a schematic cross-sectional view and a photograph of the light diffusion control film used in Comparative Example 3, the film having a louver structure only.
Figure 23B:
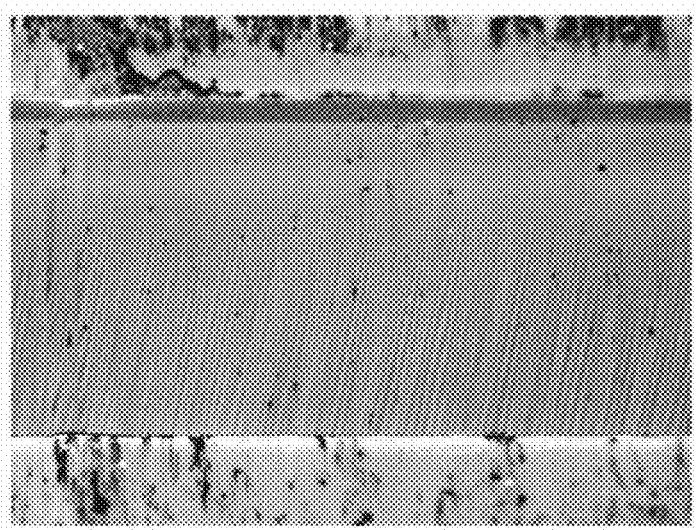
Figure 24A:
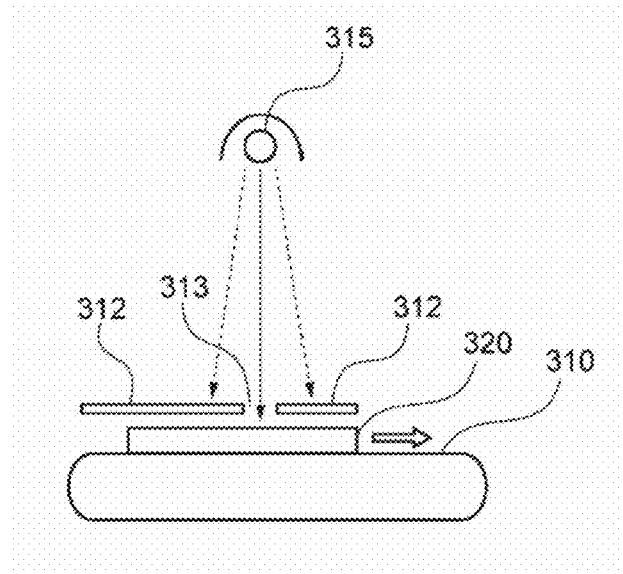
FIGS. 24A and 24B are diagrams provided to explain a conventional rear projection screen.
Figure 24B:
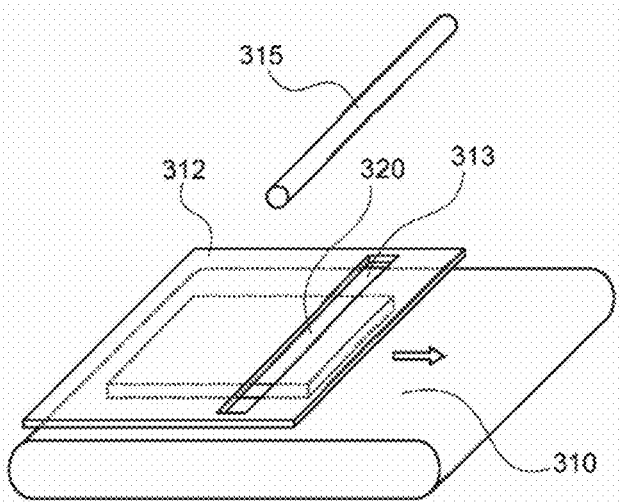

In Comparative Example 3, a rear projection screen was produced in the same manner as in Example 1, except that a laminate formed by laminating a light diffusion control film having only a louver structure as illustrated in FIGS. 23A and 23B (ID: ⇔, PD: ←), the same light diffusion control film (ID: ⇔, PD: →), a light diffusion control film having only a louver structure as illustrated in FIGS. 21A and 21B (ID: ⇔, PD: none), and the same light diffusion control film (ID: ●, PD: none) in order from the side of the soda glass plate, as illustrated in FIG. 22A, was used as a light diffusion control plate, and the resulting rear projection screen was evaluated. The results thus obtained are presented in FIG. 22B.

The light diffusion control film having only a louver structure as illustrated in FIGS. 23A and 23B was produced in the same manner as in Example 1, except that when the light diffusion control film was produced, the film thickness of the coating layer was adjusted to 165 μm, the first irradiation with ultraviolet radiation was performed under the conditions of an angle of irradiation of 15°, a peak illuminance of 2.42 W/cm$^2$, and a cumulative amount of light of 37.0 mJ/cm$^2$, the second irradiation with ultraviolet radiation was not performed, and instead, the light diffusion control film was completely cured by irradiating scattered light having a random angle of irradiation in a state of having a release film laminated thereon.

As described above, according to the invention, when a plurality of sheets of a light diffusion control film having predetermined internal structures within the film are laminated so as to obtain a light diffusion control plate, despite that the number of laminated sheets of the light diffusion control film is small such as 3 to 4 sheets, incident light coming from a wide angle can be effectively diffused, and even in a case in which the light diffusion control plate is applied to a large-sized screen, a projection screen which provides a wide viewing angle can be obtained.

Therefore, the projection screen of the invention is expected to significantly contribute to the quality enhancement of screens.

REFERENCE NUMERALS

1: coating layer, 1': internal structure-unformed region, 2: process sheet, 10: light diffusion control film, 11: region having relatively low refractive index (plate-shaped region having relatively low refractive index), 12: plate-shaped region having relatively high refractive index, 14: pillar-shaped object, 16: bent portion, 20: first internal structure (louver structure), 20': bent louver structure, 30: second internal structure (columnar structure), 40: overlapping internal structure, 50: light diffusion layer, 60: parallel light, 70': light that is substantially parallel light when viewed from one direction and is non-parallel random light when viewed from another direction, 125: linear light source

What is claimed is:

1. A projection screen comprising a light diffusion control plate,
the light diffusion control plate being formed by laminating a plurality of sheets of a light diffusion control film,
the light diffusion control film being a light diffusion control film having a single light diffusion layer having a first internal structure for anisotropically diffusing incident light and a second internal structure for isotropically diffusing incident light sequentially from the lower part along the film thickness direction,
wherein the first internal structure is a louver structure formed by alternately arranging a plurality of plate-shaped regions having different refractive indices in any one direction along the film plane, and
the second internal structure is a columnar structure formed by arranging a plurality of pillar-shaped objects having a relatively high refractive index to stand close together in the film thickness direction in a region having a relatively low refractive index,
wherein a plurality of the sheets of the light diffusion control film are composed of first to third light diffusion control films having the same configuration, and the first to third light diffusion control films are laminated such that the directions of exit of the first to third light diffusion control films are respectively in different directions.

2. The projection screen according to claim 1, wherein a plurality of the sheets of the light diffusion control film constituting the light diffusion control plate are laminated such that incident light coming from a projector enters the respective sheets of the light diffusion control film through the second internal structure side.

3. The projection screen according to claim 1, wherein the projection screen has an overlapping internal structure in which the position of the upper end portion of the first internal structure and the position of the lower end portion of the second internal structure overlap each other in the film thickness direction.

4. The projection screen according to claim 3, wherein the thickness of the overlapping internal structure is adjusted to a value within the range of 1 to 40 μm.

5. The projection screen according to claim 1, wherein the angle of inclination θ1 of a plurality of plate-shaped regions having different refractive indices in the first internal structure with respect to the normal line of the film plane is adjusted to a value within the range of 0° to 80°, and the angle of inclination θ2 of a plurality of pillar-shaped objects having a relatively high refractive index in the second internal structure with respect to the normal line of the film plane is adjusted to a value within the range of 0° to 45°.

6. The projection screen according to claim 1, wherein a plurality of the plate-shaped regions in the first internal structure have a bent portion at an intermediate point along the film thickness direction.

7. The projection screen according to claim 1, wherein when the projection screen is installed to be parallel to the vertical direction, the projection screen is formed by laminating a first light diffusion control film having the direction of exit facing downward, a second light diffusion control film having the direction of exit facing sideways, and a third light diffusion control film having a direction of exit that is reverse to the direction of the second light diffusion control film, in order from the side where incident light coming from a projector enters the projection screen.

8. The projection screen according to claim 1, wherein the projection screen is formed by further laminating a light diffusion control film having only a columnar structure as the internal structure, as a fourth light diffusion control film on a surface of the third light diffusion control film, the surface being on the opposite side of the side where the second light diffusion control film is laminated.

9. The projection screen according to claim 1, wherein the thickness of the light diffusion control plate is adjusted to a value within the range of 186 to 3,600 μm.

\* \* \* \* \*